United States Patent
Omoda et al.

(10) Patent No.: US 6,916,097 B2
(45) Date of Patent: Jul. 12, 2005

(54) LIGHT SOURCE DEVICE AND PROJECTION TYPE DISPLAY UNIT TO WHICH THE DEVICE IS APPLIED

(75) Inventors: Manabu Omoda, Sagamihara (JP); Ritsu Miyamoto, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/821,891

(22) Filed: Apr. 12, 2004

(65) Prior Publication Data

US 2004/0207816 A1 Oct. 21, 2004

(30) Foreign Application Priority Data

Apr. 18, 2003 (JP) ..................................... P2003-113896
Aug. 22, 2003 (JP) ..................................... P2003-299088

(51) Int. Cl.⁷ ............................................. G03B 21/28
(52) U.S. Cl. ........................... 353/31; 353/98; 385/901; 345/44; 363/555
(58) Field of Search .............................. 353/31, 33, 34, 353/37, 122; 348/771, 800, 801; 349/5, 7, 8, 9, 61, 62, 69, 70; 385/901; 345/36, 39, 44, 45, 46, 76, 82, 83; 362/551, 555, 231, 247, 800

(56) References Cited

U.S. PATENT DOCUMENTS 6,224,216 B1 * 5/2001 Parker et al. .................. 353/31
6,513,937 B1 * 2/2003 Dehmlow ...................... 353/94
6,547,400 B1 * 4/2003 Yokoyama .................... 353/98
2004/0207822 A1 * 10/2004 Lee et al. ....................... 353/98
2004/0252281 A1 * 12/2004 Fischer et al. ................. 353/53
2005/0030482 A1 * 2/2005 Childers et al. ............... 353/31

FOREIGN PATENT DOCUMENTS

JP    2000-056410    2/2000
JP    2000-078602    3/2000

* cited by examiner

Primary Examiner—William C. Dowling
(74) Attorney, Agent, or Firm—Nath & Associates PLLC; Gary M. Nath; Gregory B. Kang

(57) ABSTRACT

A light emitted from a semiconductor light emitting device array having a plurality of semiconductor light emitting devices arranged two-dimensionally on a substrate is converged by a condensing lens. In a light guide, a mirror surface is formed from a light incidence port to a light emission port along an inner wall surface. The semiconductor light emitting device array and the condensing lens are arranged in that order toward the light emission port inside the light incidence port of the light guide. A part of the inner wall surface of the light guide is narrowed down substantially along a condensing angle of the condensing lens. The light guide includes parallel inner wall surfaces facing each other, following a portion obtained by narrowing down a part of the inner wall surface, in order to emit the light (each color light) converged by the condensing lens while repeatedly reflecting the light on the mirror surface.

7 Claims, 14 Drawing Sheets

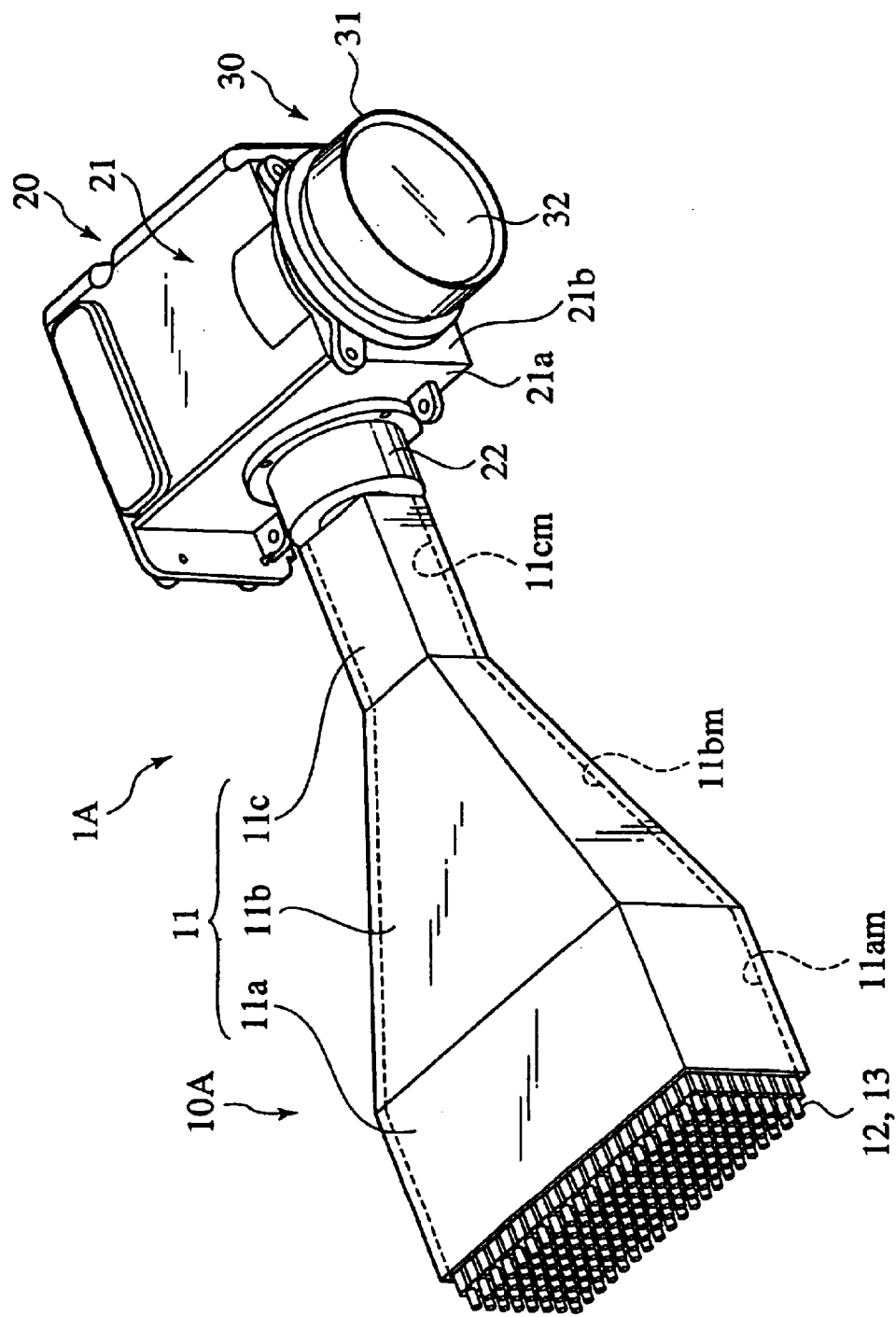

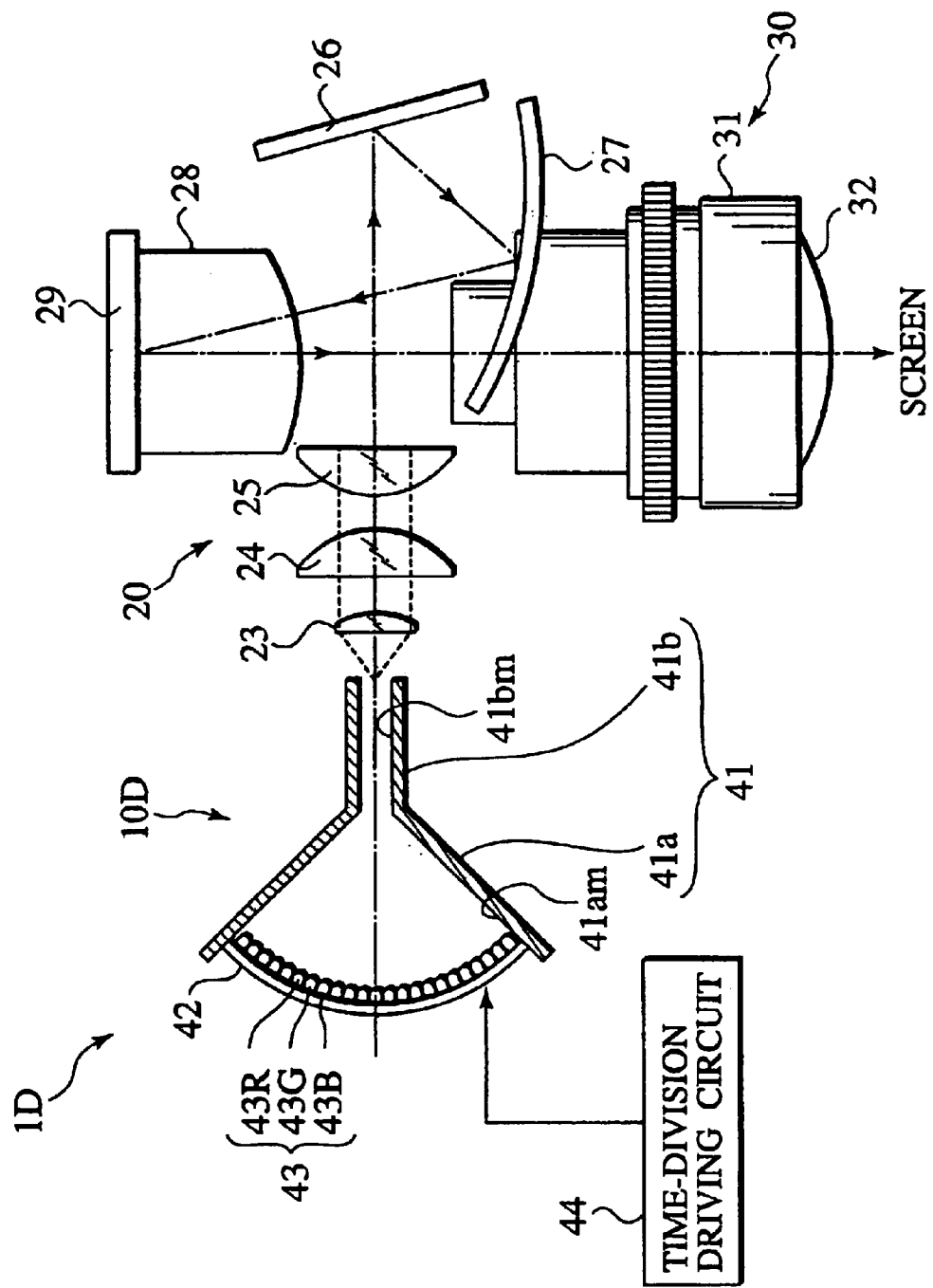

LIGHT SOURCE DEVICE AND PROJECTION TYPE DISPLAY UNIT TO WHICH THE DEVICE IS APPLIED

BACKGROUND OF THE INVENTION

1. Field of the Invention

The present invention relates to a light source device capable of securing uniformity of in-plane luminance of light emitted from a semiconductor light emitting device array, and a projection type display unit to which the light source device is applied.

2. Description of the Related Art

In recent years, there has been well used a projection type display unit for displaying, in a large screen, a high-precision color image represented by high vision broadcasting standards, ultra extended graphics array (UXGA) standards of computer graphics or the like.

The projection type display unit includes a unit to which a transmission type or reflection type space optical modulation device (e.g., a liquid crystal panel) is applied as an image display device for displaying a color image, a unit to which a digital micromirror device (DMD) is applied, and the like. Furthermore, there are a single plate system in which three colors RGB are displayed in time division, a multi-plate system in which the three colors RGB are separately displayed, and the like in accordance with the number of image display devices for use in the projection type display unit. Various types of structural modes have been applied as the projection type display unit by a combination of them. In recent years, a single-plate DMD has attracted attention, and a projection type display unit to which this DMD is applied has been proposed (e.g., see Japanese Patent Application Laid-Open No. 2000-78602 (pages 3 and 4, FIG. 1)).

Moreover, as a light source device for use in the projection type display unit, there is sometimes used a light emitting diode (LED) array which consumes less power, releases less heat, and has a longer life (e.g., see Japanese Patent No. 3319438 (pages 4 and 5, FIG. 2)).

FIG. 1 is a block diagram showing an image display unit of Prior Art 1.

An image display unit 100 of Prior Art 1 shown in FIG. 1 is described in the Japanese Patent Application Laid-Open No. 2000-78602. The unit will briefly be described with reference to the prior art.

As shown in FIG. 1, in the image display unit 100 of Prior Art 1, a white light emitted from a lamp 101 constituting a light source is separated into a red (R) light, green (G) light, and blue (B) light by a rotatable color wheel 102 which is color extraction means, and the separated color lights are incident upon a digital micromirror device (DMD) 103 to which a large number of micro movable mirrors (not shown) are attached. Here, for the DMD 103, a large number of micro movable mirrors are integrated on one chip, and an inclination of each micro movable mirror is changed with respect to each color light incident upon the chip to selectively control each color light in an ON state in which each color light is incident upon a projection lens side and in an OFF state in which each color light is prevented from being incident upon the projection lens side.

On the other hand, color signals R, G, B are input into a time division multiplex circuit 104, and in the circuit 104 signals G, R, B are time-divided in the same color order as that generated in the color wheel 102 in accordance with a color sequence signal from a color sequence control circuit 105, and then supplied to the DMD 103. In this case, the color wheel 102 includes R, G, B filters every 40° for each of three divided blocks of 120°.

Thereafter, the G, R, B color lights are reflected in a corresponding period by the DMD 103 controlled by the signals G, R, B, and a screen S is irradiated with the output light signals G, R, B in order to display the signals as color images. In this case, the respective color signals are time-divisionally supplied to the DMD 103 as repeated at a high frequency corresponding to a time shorter than a human visual reaction time. Therefore, the respective colors are time-integrated in a human visual sense, and recognized as the color image including white.

The image display unit 100 according to Prior Art 1 has been used in many projection type display units because a constitution of an optical system is simple and the unit is appropriate for miniaturization.

On the other hand, the use of semiconductor light emitting devices such as LED as the light source for the projection type display unit which outputs the color image has been studied.

A light source device 200 of Prior Art 2 shown in FIGS. 2A and 2B is described in the Japanese Patent No. 3319438, and will be briefly described with reference to the drawings.

As shown in FIG. 2A, in the light source device 200 of Prior Art 2, the following arrays are arranged facing three side surfaces of a dichroic prism 201 crossing one another at right angles: a red LED array 203R in which a plurality of red LEDs are two-dimensionally arranged on a substrate 202R for R and a lens array 204R facing the red LED array 203R; a green LED array 203G in which a plurality of green LEDs are two-dimensionally arranged on a substrate 202G for G and a lens array 204G facing the green LED array 203G; and a blue LED array 203B in which a plurality of blue LEDs are two-dimensionally arranged on a substrate 202B for B and a lens array 204B facing the blue LED array 203B.

In this case, as shown in FIG. 2B, for example, for the red LED array 203R, the red LEDs are integrated in a matrix of 5×4 columns, and the respective red LEDs emit the light in the same timing. Moreover, the red light emitted from the red LED array 203R is converted to the light high in parallelism by the lens array 204R, and thereafter incident upon the dichroic prism 201.

Moreover, the red light emitted from the red LED array 203R is reflected by a red reflecting mirror of the dichroic prism 201. Furthermore, the green light emitted from the green LED array 203G is transmitted through the dichroic prism 201. Additionally, the blue light emitted from the blue LED array 203B is reflected by a blue reflecting mirror. In this manner, in the dichroic prism 201, the red, green, and blue lights are synthesized and emitted as a white light from a side surface without the respective color LED arrays 203R, 203G, 203B.

Additionally, when the red LED array 203R, green LED array 203G, and blue LED array 203B used in the light source device 200 of Prior Art 2 are applied to the image display unit 100 of Prior Art 1 instead of the lamp 101, low power consumption, small heat release value, and long life are achieved, but the following new problems occur.

That is, for a first problem, the lens arrays 204R, 204G, 204B for R, G, B are required for the LED arrays 203R, 203G, 203B for the RGB colors, the dichroic prism 201 which is very expensive needs to be used, and it is difficult to reduce costs and sizes of the projection type display unit and the light source device.

Moreover, for a second problem, an emission luminance is not always equal in a plane by emission fluctuations among LEDs in the LED arrays 203R, 203G, 203B for the RGB colors. When the luminance differs with R, G, B, and the white light is displayed, color unevenness appears, and this remarkably degrades an image display quality.

SUMMARY OF THE INVENTION

There has been a demand for a light source device in which a plurality of semiconductor light emitting devices (e.g., LED) for three colors R, G, B are arranged on one or a plurality of substrates in accordance with a ratio of light emitting luminance and in which the semiconductor light emitting devices for the respective colors are driven in time division for each color and thus which is capable of securing uniformity of an in-plane luminance of each color light from the semiconductor light emitting device for each color. There has been also a demand for a projection type display unit to which the light source device is applied.

To achieve the above-described object, there is provided a light source device comprising: a semiconductor light emitting device array having a plurality of semiconductor light emitting devices arranged two-dimensionally on a substrate; a condensing lens which converges light emitted from the semiconductor light emitting device array; and a light guide in which a mirror surface is formed along an inner wall surface from a light incidence port to a light emission port and in which the semiconductor light emitting device array and the condensing lens are arranged in that order toward the light emission port inside the light incident port and whose part of the inner wall surface is narrowed down substantially along a condensing angle of the condensing lens to emit the light converged by the condensing lens via the light emission port.

According to the present invention, especially to converge the light emitted from the semiconductor light emitting device array by the condensing lens, the semiconductor light emitting device array and the condensing lens are arranged in that order toward the light emission port on the light incidence port side inside the light guide, and a part of the inner wall surface of the light guide is narrowed down substantially along the condensing angle of the condensing lens to emit the light converged by the condensing lens via the light emission port. Therefore, the light emitted from the semiconductor light emitting device array can be converged with good efficiency.

In a preferable embodiment of the present invention, the light guide includes parallel inner wall surfaces facing each other and following a portion obtained by narrowing down a part of the inner wall surface in order to emit the light (or color light) converged by the condensing lens while repeatedly reflecting the light by the mirror surface.

According to the embodiment, for the light guide, the parallel inner wall surfaces facing each other are formed following the portion obtained by narrowing down a part of the inner wall surface in order to emit the light converged by the condensing lens (or color light) while repeatedly reflecting the light by the mirror surface. Therefore, a light source image having a nonuniform distribution by the light (or color light) emitted from the semiconductor light emitting device array is also integrated/averaged. As a result, a uniform intensity distribution can be obtained, and therefore the uniformity of the in-plane luminance of the light (or color light) emitted from the semiconductor light emitting device array can be secured.

Moreover, to achieve the object, there is provided a projection type display unit comprising: the above-described light source device; an image display part optical system which irradiates an image display device with the light (or color light) emitted from the light source device; and a projection part optical system which projects an image light displayed on the image display device.

According to the present invention, since the unit comprises the above-described light source device, the image display part optical system for irradiating the image display device with the light emitted from the light source device, and the projection part optical system for projecting the image light displayed on the image display device, the unit is capable of displaying the image having no color unevenness on a screen.

Moreover, to achieve the object, there is provided a light source device comprising: a dichroic prism having first and second dichroic mirrors which are formed intersecting with each other therein; semiconductor light emitting device arrays for three colors, which are respectively arranged to face three side surfaces of the dichroic prism crossing one another at right angles, each array including a substrate and a plurality of semiconductor light emitting devices that are two-dimensionally arranged on the substrate and emit the light of each color of the three colors; a condensing lens that condenses respective color lights which are emitted from the semiconductor light emitting device arrays for three colors and whose wavelength bands are selected by the first and second dichroic mirrors via the dichroic prism; and a light guide in which a mirror surface is formed from a light incidence port to a light emission port along an inner wall surface and in which the dichroic prism is disposed in the vicinity of the light incidence port and in which the condensing lens is disposed inside the light incidence port and which emits the respective color lights obtained by narrowing down a part of the inner wall surface substantially along a condensing angle of the condensing lens and condensing the respective color lights by the condensing lens via the light emission port.

According to the present invention, especially to converge respective color lights emitted from the semiconductor light emitting device arrays for three colors by the condensing lens via the dichroic prism, the dichroic prism is disposed in the vicinity of the light incidence port of the light guide, and the condensing lens is disposed inside the light incidence port. Moreover, the respective color lights obtained by narrowing down a part of the inner wall surface of the light guide substantially along the condensing angle of the condensing lens and condensing the respective color lights by the condensing lens are emitted from the light emission port. Therefore, the respective color lights emitted from the semiconductor light emitting device arrays for three colors can be converged with good efficiency.

In another preferable embodiment of the present invention, the light guide includes parallel inner wall surfaces facing each other and following a portion obtained by narrowing down a part of the inner wall surface in order to emit the light (or the respective color lights) converged by the condensing lens while repeatedly reflecting the light by the mirror surface.

According to the embodiment, for the light guide, the parallel inner wall surfaces facing each other are formed following the portion obtained by narrowing down a part of the inner wall surface in order to emit the light (or each color light) converged by the condensing lens while repeatedly reflecting the light by the mirror surface. Therefore, the light source image having the nonuniform distribution by the light (or the respective color lights) emitted from the semiconductor light emitting device array (or the semiconductor light emitting device arrays for three colors) is also integrated/averaged. As a result, since the uniform intensity distribution can be obtained, the uniformity of the in-plane luminance of the light (or the respective color lights) emitted from the semiconductor light emitting device array (or the semiconductor light emitting device arrays for three colors) can be secured.

Moreover, to achieve the object, there is provided a projection type display unit comprising: the above-described light source device; an image display part optical system which irradiates an image display device with the light (or the respective color lights) emitted from the light source device; and a projection part optical system which projects an image light displayed on the image display device.

According to the present invention, since the unit comprises the above-described light source device, the image display part optical system for irradiating the image display device with the light emitted from the light source device, and the projection part optical system for projecting the image light displayed on the image display device, the unit is capable of displaying the image having no color unevenness on the screen.

Furthermore, to achieve the object, there is provided a projection type display unit comprising: a semiconductor light emitting device array having a plurality of semiconductor light emitting devices arranged two-dimensionally on a substrate; a toroidal lens which converges light emitted from the semiconductor light emitting device array; a light guide in which a mirror surface is formed from a light incidence port to a light emission port along an inner wall surface and in which the semiconductor light emitting device array and the toroidal lens are arranged in that order toward the light emission port inside the light incidence port and in which the light obtained by narrowing down a part of the inner wall surface substantially along a condensing angle of the toroidal lens and condensing the light by the toroidal lens is emitted from the light emission port; an image display part optical system which irradiates an image display device with the light emitted from the light emission port side of the light guide; and a projection part optical system which projects an image light displayed on the image display device, wherein a horizontal direction component of an aspect ratio of the semiconductor light emitting device array is set to be larger than that of an aspect ratio of the image display device, and the aspect ratio on the light emission port side of the light guide is converted by the toroidal lens to be substantially matched with the aspect ratio of the image display device.

According to the present invention, the semiconductor light emitting device array and the toroidal lens are arranged in that order toward the light emission port on the light incidence port side of the light guide, and the light obtained by narrowing down a part of the inner wall surface of the light guide substantially along the condensing angle of the toroidal lens and condensing the light by the toroidal lens is emitted from the light emission port. The image display device of the image display part optical system is irradiated with the light, and the light is projected by the projection part optical system. In this case, especially the horizontal direction component of the aspect ratio of the semiconductor light emitting device array is set to be larger than that of the aspect ratio of the image display device. Moreover, the aspect ratio on the light emission port side of the light guide is converted by the toroidal lens so as to be substantially matched with the aspect ratio of the image display device. Therefore, when the luminance of the light emitted from the semiconductor light emitting device array is raised, the thickness of the light source device including the semiconductor light emitting device array and toroidal lens attached onto the incidence portion side of the light guide is not increased, and the device can be miniaturized. Therefore, the projection type display unit can also be miniaturized, and the image having no color unevenness can be displayed on the screen.

The nature, principle and utility of the invention will become more apparent from the following detailed description when read in conjunction with the accompanying drawings.

BRIEF DESCRIPTION OF THE DRAWINGS

In the accompanying drawings:

FIG. 2A is a plan view seen from an upper surface of the light source device, and FIG. 2B is a side view of the red LED array seen from a side surface;

FIG. 3 is an appearance diagram showing appearances of the light source device of Embodiment 1 and a projection type display unit of Embodiment 1 to which the light source device is applied according to the present invention;

FIG. 6A is a top plan view, FIG. 6B is a front view, FIG. 6C is a bottom plan view, FIG. 6D is a side view, and FIG. 6E is a perspective view;

FIG. 7A is a top plan view, FIG. 7B is a front view, FIG. 7C is a bottom plan view, FIG. 7D is a side view, and FIG. 7E is a perspective view;

FIG. 14 is a constitution diagram showing the light source device of Embodiment 4 and the projection type display unit of Embodiment 4 to which the light source device is applied according to the present invention;

DESCRIPTION OF THE PREFERRED EMBODIMENTS

Embodiments of a light source device and a projection type display unit to which the light source device is applied according to the present invention will be described in detail in order of Embodiments 1 to 7 with reference to FIGS. 3 to 17.

<Embodiment 1>

Figure 4:
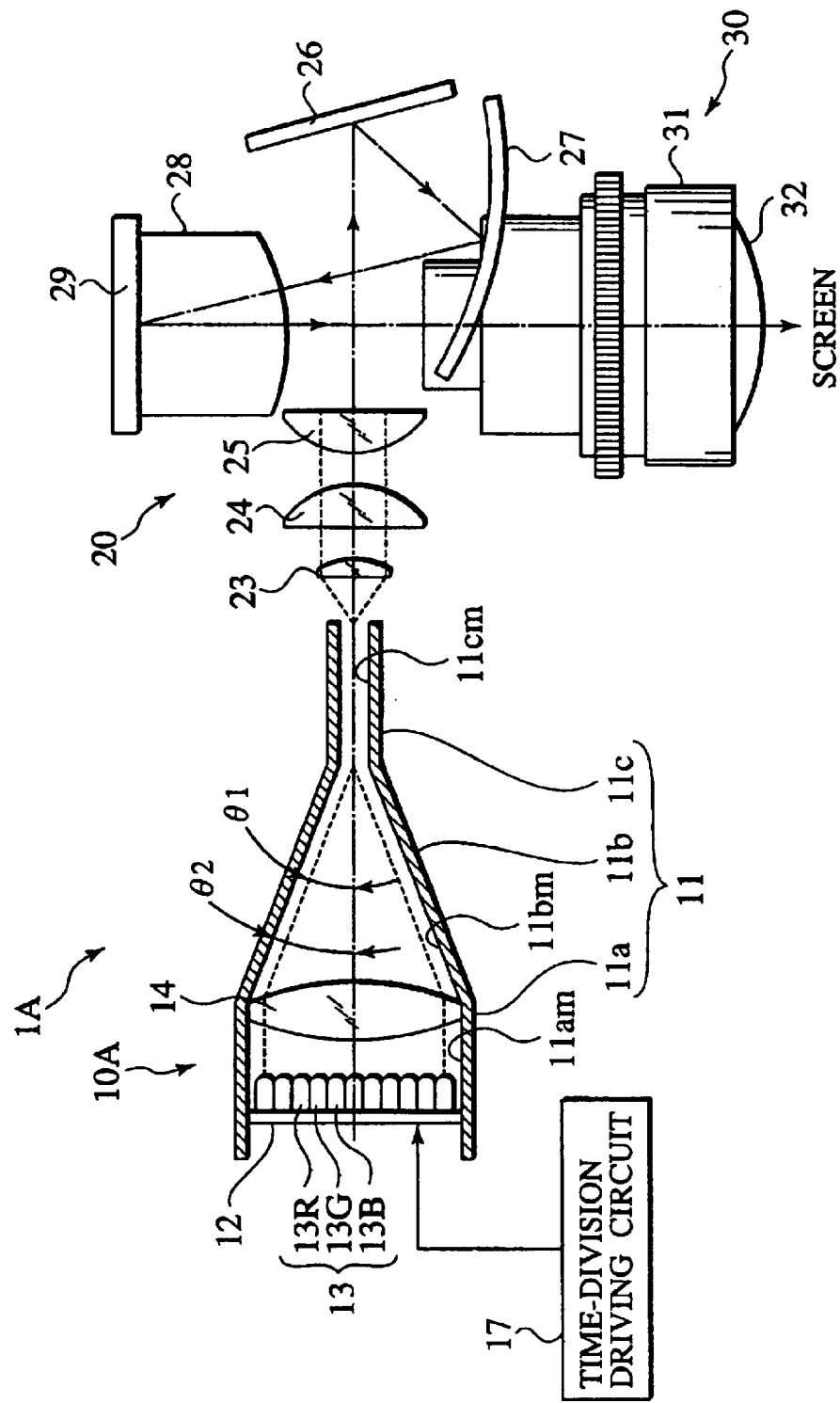
FIG. 4 is a constitution diagram showing the light source device of Embodiment 1 and the projection type display unit of Embodiment 1 to which the light source device is applied according to the present invention.
Figure 5:
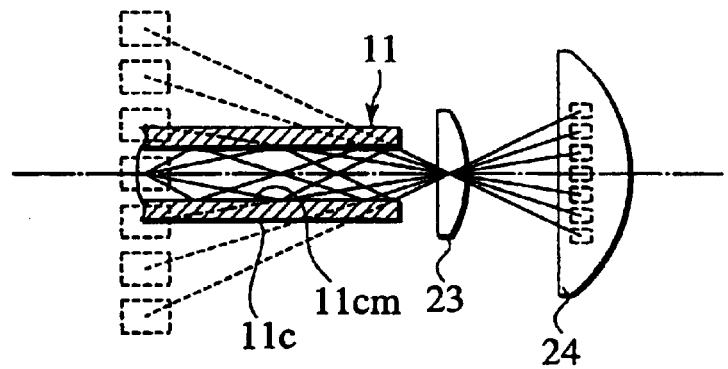
FIG. 5 is a diagram showing a state in which each color light from the LED array is repeatedly reflected by a mirror surface formed in a small quadratic prism portion of a light guide in the light source device of Embodiment 1 according to the present invention.
Figure 6A:
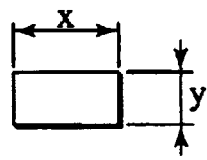
FIGS. 6A to 6E are diagrams showing red, green, and blue LEDs constituting the LED array in the light source device of Embodiment 1 according to the present invention.
Figure 6B:
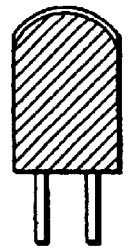
Figure 6D:
Figure 6C:
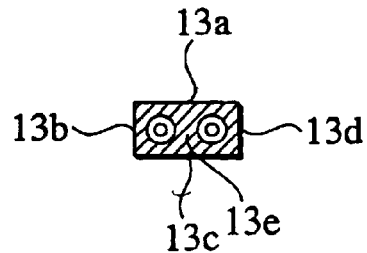
Figure 6E:
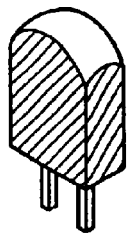
Figure 7A:
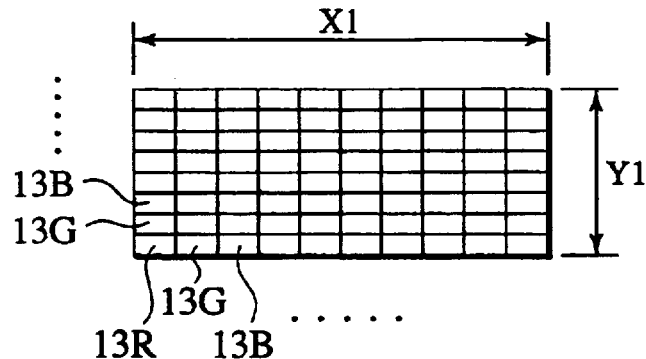
FIGS. 7A to 7E are diagrams showing the LED array in the light source device of Embodiment 1 according to the present invention.
Figure 7B:
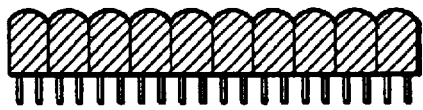
Figure 7D:
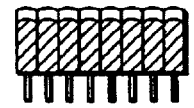
Figure 7C:
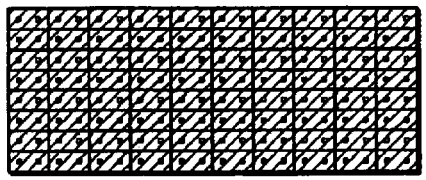
Figure 7E:
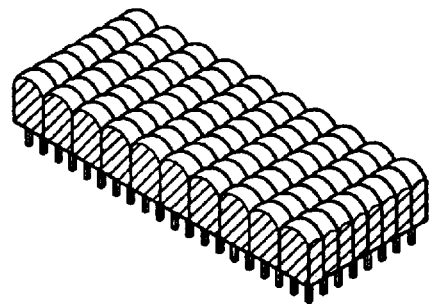
Figure 8:
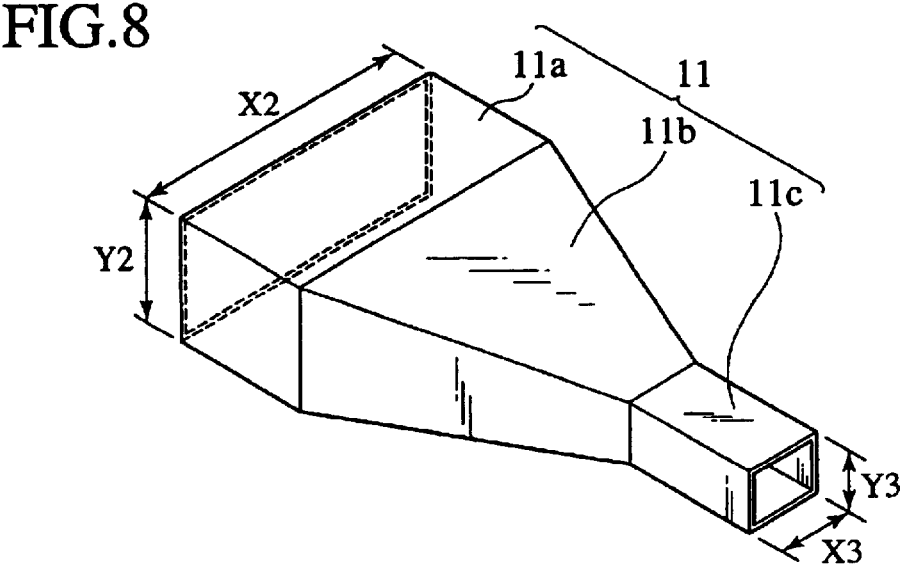
FIG. 8 is a perspective view showing aspect ratios of large and small quadratic prism portions of the light guide in the light source device of Embodiment 1 according to the present invention.

FIG. 3 is an appearance diagram showing appearances of the light source device of Embodiment 1 and a projection type display unit of Embodiment 1 to which the light source device is applied according to the present invention. FIG. 4 is a constitution diagram showing the light source device of Embodiment 1 and the projection type display unit of Embodiment 1 to which the light source device is applied according to the present invention. FIG. 5 is a diagram showing a state in which each color light from the LED array is repeatedly reflected by a mirror surface formed in a small quadratic prism portion of a light guide in the light source device of Embodiment 1 according to the present invention. FIGS. 6A to 6E are diagrams showing red, green, and blue LEDs constituting the LED array in the light source device of Embodiment 1 according to the present invention, FIG. 6A is a top plan view, FIG. 6B is a front view, FIG. 6C is a bottom plan view, FIG. 6D is a side view, and FIG. 6E is a perspective view. FIGS. 7A to 7E are diagrams showing the LED array in the light source device of Embodiment 1 according to the present invention, FIG. 7A is a top plan view, FIG. 7B is a front view, FIG. 7C is a bottom plan view, FIG. 7D is a side view, and FIG. 7E is a perspective view. FIG. 8 is a perspective view showing aspect ratios of large and small quadratic prism portions of the light guide in the light source device of Embodiment 1 according to the present invention.

As shown in FIGS. 3 and 4, a projection type display unit 1A of Embodiment 1 according to the present invention schematically comprises: a light source device 10A in which a light emitted from a semiconductor light emitting device array 13 attached onto a rectangular substrate 12 in a light guide 11 is converged by a convex lens 14 functioning as a condensing lens and emitted; an image display part optical system 20 which irradiates an image display device (hereinafter referred to as DMD) 29 with the light emitted from the light source device 10A; and a projection part optical system 30 which projects an image light displayed on the DMD 29.

That is, in the light source device 10A of Embodiment 1 according to the present invention, a large quadratic prism portion 11a largely opened in a large quadrangular shape is formed on a light incidence port side of the light guide 11, a quadrangular pyramid portion 11b whose inner wall surface is narrowed down toward a light emission port is formed following the large quadratic prism portion 11a, and further a small quadratic prism portion 11c reduced in a shape analogous to that of the large quadratic prism portion 11a and opened in a small quadrangular shape is integrally formed following the quadrangular pyramid portion 11b. Moreover, mirror surfaces 11am, 11bm, 11cm are mirror-surface-processed along the inner wall surfaces of the large quadratic prism portion 11a, quadrangular pyramid portion 11b, and small quadratic prism portion 11c by use of aluminum, silver or the like. In this case, among the mirror surfaces 11am, 11bm, 11cm formed to the light emission port from the light incidence port along the inner wall surface, the mirror surface 11am is formed along the parallel inner wall surfaces of the large quadratic prism portion 11a facing each other. Moreover, the mirror surface 11bm is formed along the inclined inner wall surfaces of the quadrangular pyramid portion 11b facing each other, and the mirror surface 11cm is formed along the parallel inner wall surfaces of the small quadratic prism portion 11c facing each other. Furthermore, portions via which the large quadratic prism portion 11a, quadrangular pyramid portion 11b, and small quadratic prism portion 11c are bonded to one another are continued without any gap, and are subjected to the mirror-surface processing. Accordingly, the light emitted from the semiconductor light emitting device array 13 described later is prevented from leaking. Moreover, the light from the semiconductor light emitting device array 13 repeats total reflection on the respective mirror surfaces 11am, 11bm, 11cm, and can be emitted via the light emission port side of the small quadratic prism portion 11c of the light guide 11 with good efficiency.

It is to be noted that plate-shaped mirrors (not shown) including the mirror surfaces formed along the inner wall surface of the light guide 11 may also be bonded.

Moreover, in the large quadratic prism portion 11a on the light incidence port side of the light guide 11, the semiconductor light emitting device array 13 is attached in which a plurality of semiconductor light emitting devices 13R, 13G, 13B emitting red (R) light, green (G) light, and blue (B) light are arranged two-dimensionally in horizontal and vertical directions on the rectangular substrate 12 in accordance with a ratio of emission luminance. Furthermore, the convex lens 14 is attached as a condensing lens for condensing the respective color lights emitted from the semiconductor light emitting devices 13R, 13G, 13B. Therefore, the semiconductor light emitting device array 13 and convex lens 14 are arranged in that order toward the light emission port on the light incidence port side inside the light guide 11.

In this case, light emitting diodes (LED) which emit the red (R) light, green (G) light, and blue (B) light, respectively, are used as the semiconductor light emitting devices 13R, 13G, 13B constituting the semiconductor light emitting device array 13. The semiconductor light emitting device array 13 will be hereinafter referred to as the LED array 13, and the semiconductor light emitting devices 13R, 13G, 13B will be referred to as the red LED 13R, green LED 13G, and blue LED 13B. It is to be noted that although not shown, RGB semiconductor lasers, RGB organic electroluminescence or the like may also be applied as the semiconductor light emitting device array.

Moreover, the LED array 13 is connected to a time-division driving circuit 17 via the rectangular substrate 12, one field of the image displayed in the DMD 29 in the image display part optical system 20 described later is divided into three by the time-division driving circuit 17, and the LEDs 13R, 13G, 13B are time-divisionally driven for the respective colors.

Furthermore, each color light from the LED array 13 in the light source device 10A is narrowed down by the convex lens 14, and incident upon the image display part optical system 20.

For the image display part optical system 20, collimator lens group 23 to 25 is attached in a lens body tube 22 (FIG. 3) attached to a surface 21a of a housing 21 (FIG. 3) facing the light source device 10A. Moreover, reflective mirrors 26, 27, a lens 28, and the digital micro mirror device (DMD) 29 in which a large number of micro movable mirrors are integrated on one chip are attached in the housing 21.

Moreover, the red, green, and blue lights emitted from the LED array 13 of the light source device 10A by the time-divisional driving pass through the collimator lens group 23 to 25 in that order and through the reflective mirrors 26, 27 and lens 28 three-dimensionally intersecting with one another before the projection part optical system 30, and are incident upon the DMD 29 from an oblique direction. In this case, for the DMD 29, a large number of micro movable mirrors (not shown) are selectively ON-OFF controlled by a mirror control circuit (not shown) in synchronization with the time-division driving circuit 17.

Furthermore, the image light modulated for each of R, G, B is projected onto a screen (not shown) by the time-divisional driving by the projection part optical system 30, and the image light projected onto the screen is integrated in human visual sense by high-rate repetition by the time-divisional driving, and is recognized as a full-color image.

For the projection part optical system 30, a lens body tube 31 is attached to a surface 21b crossing the surface 21a of the housing 21 (FIG. 3) at right angles, and a projection lens 32 is built in the lens body tube 31.

Moreover, for the red, green, blue lights emitted from the red LED 13R, green LED 13G, blue LED 13B constituting the LED array 13 in the light source device 10A, a beam area is reduced in accordance with a condensing angle $\theta 1$ of the convex lens 14 every time-divisional driving. However, in this case, an inclination angle $\theta 2$ of the quadrangular pyramid portion 11b of the light guide 11 is set to be substantially equal to the condensing angle $\theta 1$ of the convex lens 14. Accordingly, each color light from the LED array 13 can be converged with good efficiency. In other words, the inner wall surface of the quadrangular pyramid portion 11b of the light guide 11 is narrowed down substantially along the condensing angle $\theta 1$ of the convex lens 14.

Therefore, most part of each color light emitted from the LED array 13 proceeds substantially in parallel in the large quadratic prism portion 11a of the light guide 11 and is incident upon the convex lens 14. Moreover, a part of the light is reflected by the parallel mirror surface 11am in the large quadratic prism portion 11a and is incident upon the convex lens 14. Thereafter, for each color light which has passed through the convex lens 14, the most part of the light reduced by the convex lens 14 proceeds toward the small quadratic prism portion 11c along the inclination angle $\theta 2$ of the quadrangular pyramid portion 11b of the light guide 11, and one part is reflected by the inclined mirror surface 11bm in the quadrangular pyramid portion 11b and proceeds toward the small quadratic prism portion 11c. Furthermore, as shown in FIG. 5 in an enlarged scale, each color light which has entered the small quadratic prism portion 11c of the light guide 11 repeats the total reflection by the parallel mirror surface 11cm in the small quadratic prism portion 11c while proceeding to the light emission port. By a function of the collimator lens 23 installed on the light emission port side of the small quadratic prism portion 11c, a plurality of images are formed in the vicinity of the collimator lens 24 in accordance with the number of reflections on the parallel mirror surface 11cm formed in the small quadratic prism portion 11c. Accordingly, a plurality of LEDs which are time-divisionally driven by the LED array 13 and which have the same color perform superimposition illuminating. Even the light source image having a nonuniform distribution by the light emitted from the LED array 13 is integrated/averaged. As a result, since a uniform strength distribution can be obtained, uniformity in an in-plane luminance of the light emitted from the LED array 13 can be secured.

In this case, the LED array 13 in which the red LED 13R, green LED 13G, blue LED 13B are two-dimensionally arranged in accordance with the ratio of the emission luminance is integrated in a spotted pattern on the rectangular substrate 12. Therefore, with single-color emission, a nonuniform strength distribution results. At a three-color simultaneous lighting time, an illuminative light having much color unevenness in the spotted pattern is obtained by a difference in distribution degree, but the white light having no color unevenness can be obtained in the uniform strength distribution even with the single-color emission by the above-described superimposed illuminating.

In a time-division mixed color method by Embodiment 1, the three-color simultaneous lighting is not performed, but RGB is integrated in the human visual sense, and it is important to uniformly emit the light from the LED array 13 by the mirror surfaces 11am, 11bm, 11cm formed along the respective inner wall surfaces of the large quadratic prism portion 11a, quadrangular pyramid portion 11b, and small quadratic prism portion 11c.

Next, as shown in FIGS. 6A to 6E, the LED array 13 is constituted by packaging the red LED 13R, green LED 13G, and blue LED 13B in a transparent resin, but in Embodiment 1 the array has a rectangular section with respect to an emission axis, and an aspect ratio x:y by a horizontal direction dimension x and vertical direction dimension y of the section is set to 2:1. Accordingly, the red LED 13R, green LED 13G, and blue LED 13B can be integrated closely without any gap. Moreover, two power supply terminals protruded from each of the respective color LEDs 13R, 13G, 13B are arranged at an equal interval in both the vertical and horizontal directions, and this facilitates wiring. The mirror surfaces are formed outside four side surfaces 13a to 13d of the red LED 13R, green LED 13G, blue LED 13B and outside a bottom surface 13e excluding a periphery of the power supply terminal. The respective mirror surfaces prevent light leakage, and fulfill a function of increasing a forward emitted light quantity. It is to be noted that when the red LED 13R, green LED 13G, and blue LED 13B are integrated, and the mirror surface of the adjacent LED is used, all the five surfaces do not have to be the mirror surfaces, and any of the surfaces may be the mirror surface.

Next, as shown in FIGS. 7A to 7E, an aspect ratio X1:Y1 by a horizontal direction dimension X1 and vertical direction dimension Y1 of the LED array 13 in which the red LED 13R, green LED 13G, blue LED 13B are two-dimensionally arranged is usually set substantially in accordance with an aspect ratio X7:Y7=4:3 or 16:9 of a mirror surface 29m (FIG. 13D) of the DMD 29. Accordingly, to transmit each color light while constantly maintaining the equal aspect ratio to the DMD 29 from the LED array 13, as shown in FIG. 8, an aspect ratio X2:Y2 of the large quadratic prism portion 11a of the light guide 11, and an aspect ratio X3:Y3 of the small quadratic prism portion 11c reduced in a shape analogous to that of the large quadratic prism portion 11a are also set substantially in accordance with the aspect ratio X7:Y7 of the mirror surface 29m (FIG. 13D) of the DMD 29. Accordingly, each color light emitted from the LED array 13 can securely reach the DMD 29.

Therefore, as described above, the light emitted from the LED array 13 can be converged with good efficiency in the light source device 10A. The color image can be projected onto the screen (not shown) without any color unevenness and with high image quality in the projection type display unit 1A to which the light source device 10A is applied.

<Embodiment 2>

Figure 9:
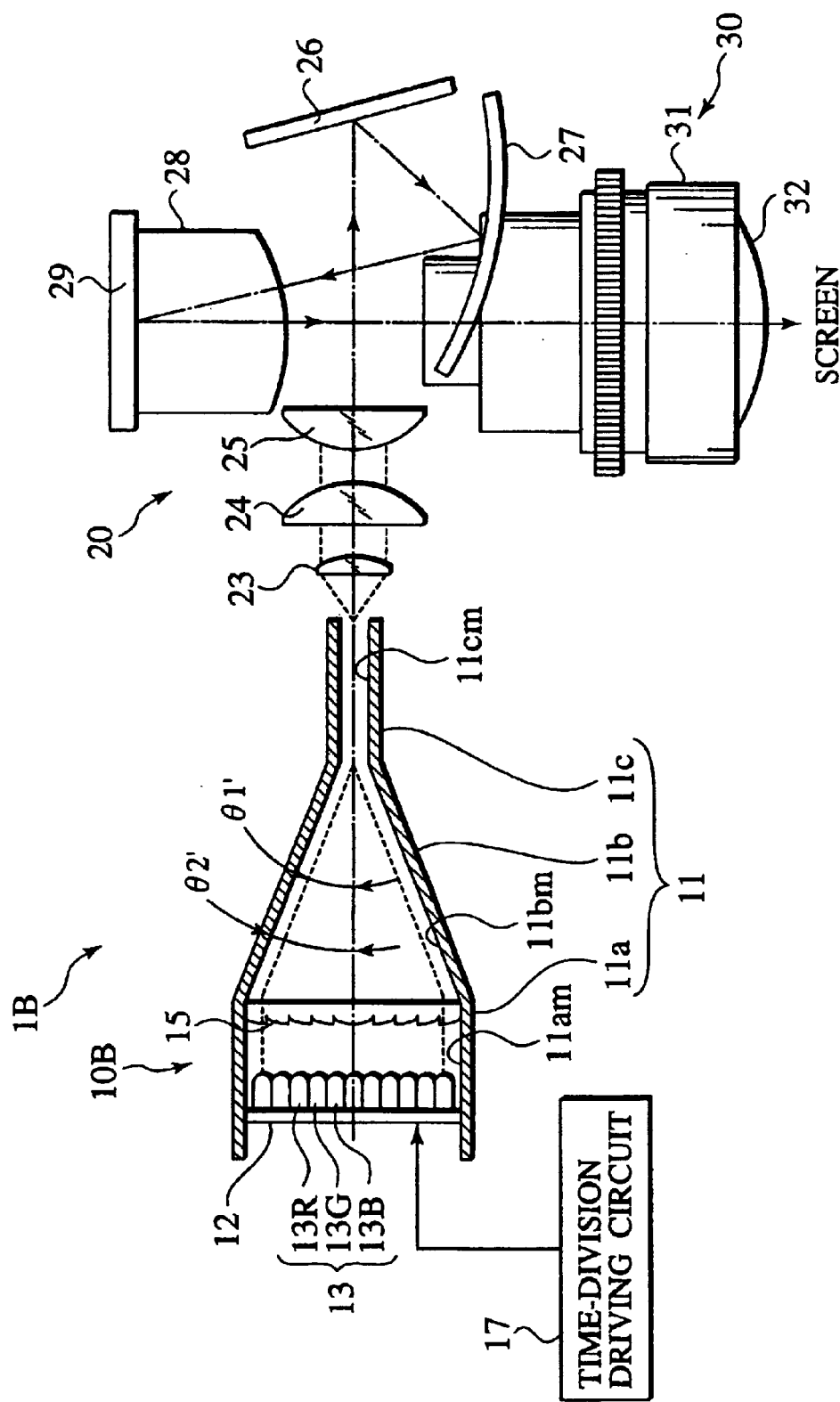
FIG. 9 is a constitution diagram showing the light source device of Embodiment 2 and the projection type display unit of Embodiment 2 to which the light source device is applied according to the present invention.

FIG. 9 is a constitution diagram showing the light source device of Embodiment 2 and the projection type display unit of Embodiment 2 to which the light source device is applied according to the present invention.

A light source device 10B of Embodiment 2 according to the present invention and a projection type display unit 1B of Embodiment 2 to which the light source device 10B is applied as shown in FIG. 9 have constitutions similar to those of the light source device 10A and projection type display unit 1A of Embodiment 1 described above except a part. For the sake of convenience in the description, the same constituting members as those of Embodiment 1 are denoted with the same reference numerals, constituting members different from those of Embodiment 1 are denoted with new reference numerals, and only a respect different from that of Embodiment 1 will be described.

That is, as shown in FIG. 9, the projection type display unit 1B of Embodiment 2 substantially comprises the light source device 10B, image display part optical system 20, and projection part optical system 30, and only the light source device 10B is different from Embodiment 1.

In the light source device 10B, the LED array 13 is attached to the rectangular substrate 12 in the large quadratic prism portion 11a on the light incidence port side of the light guide 11 in the same manner as in Embodiment 1. The present embodiment is different from Embodiment 1 in that a Fresnel lens 15 is attached as the condensing lens for condensing each color light emitted from the LED array 13. Therefore, the LED array 13 and Fresnel lens 15 are arranged in that order toward the light emission port side on the light incidence port side inside the light guide 11.

For the Fresnel lens 15, since a plurality or multiplicity of annular lenses are concentrically formed, a lens thickness can be set to be smaller than that of the convex lens 14 (FIG. 4) used in Embodiment 1, and therefore the light source device 10B can be miniaturized.

In this case, even in the light source device 10B of Embodiment 2, for the red (R) light, green (G) light, and blue (B) light emitted from the red LED 13R, green LED 13G, blue LED 13B constituting the LED array 13, the beam area is reduced in accordance with a condensing angle θ1 ' of the Fresnel lens 15 every time-divisional driving. However, in this case, when an inclination angle θ2' of the quadrangular pyramid portion 11b of the light guide 11 is set to be substantially equal to the condensing angle θ1 ' of the Fresnel lens 15, the each color light from the LED array 13 can be converged with good efficiency.

Accordingly, the projection type display unit 1B to which the light source device 10B is applied can also be miniaturized. Needless to say, the light source device 10B and the projection type display unit 1B to which the light source device 10B is applied can obtain an effect similar to that of Embodiment 1.

<Embodiment 3>

Figure 10:
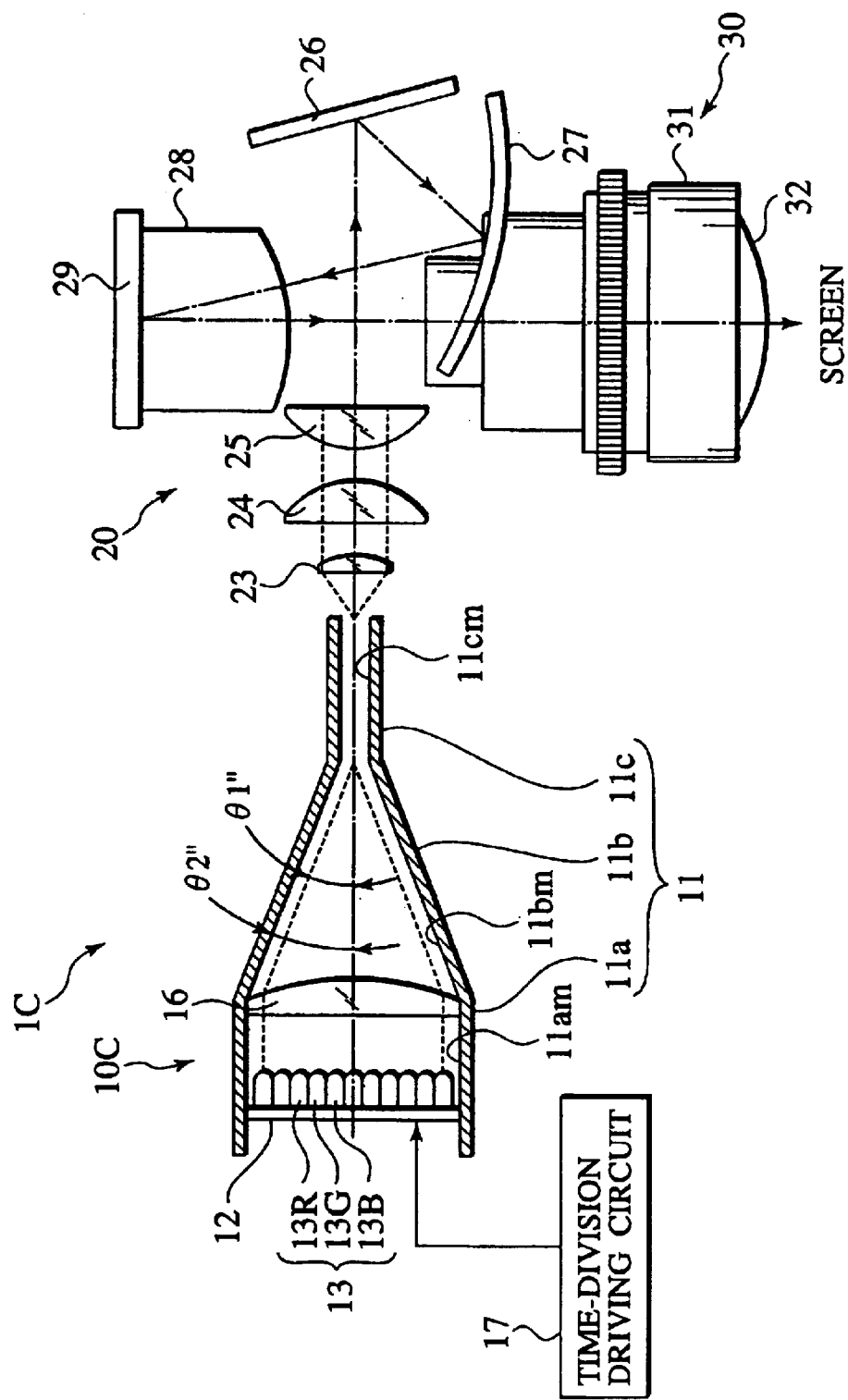
FIG. 10 is a constitution diagram showing the light source device of Embodiment 3 and the projection type display unit of Embodiment 3 to which the light source device is applied according to the present invention.
Figure 11:
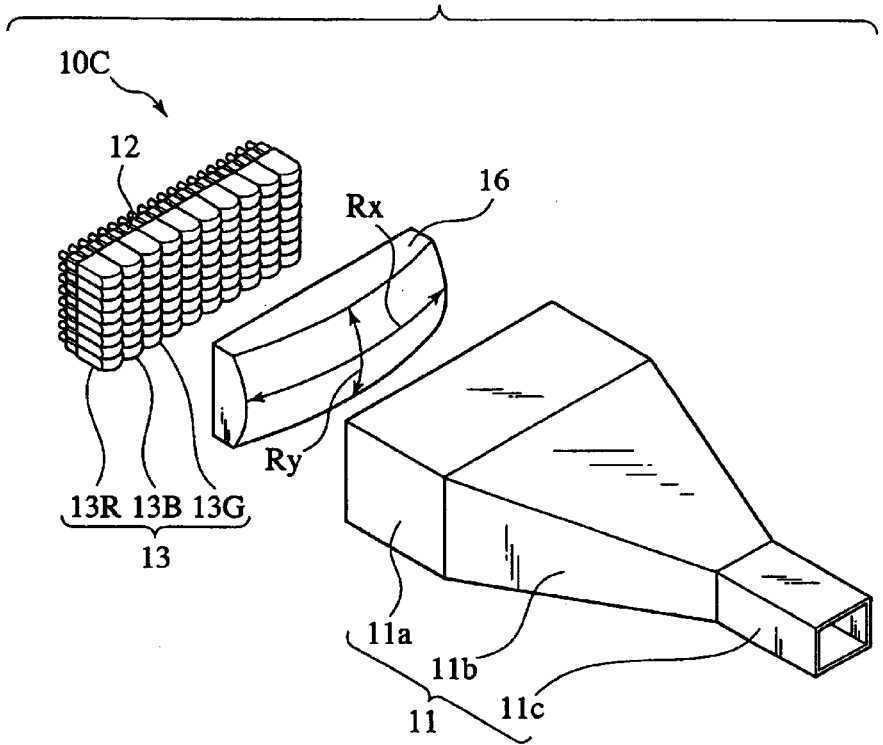
FIG. 11 is an exploded perspective view showing the light source device of Embodiment 3 according to the present invention in an exploded manner.
Figure 12:
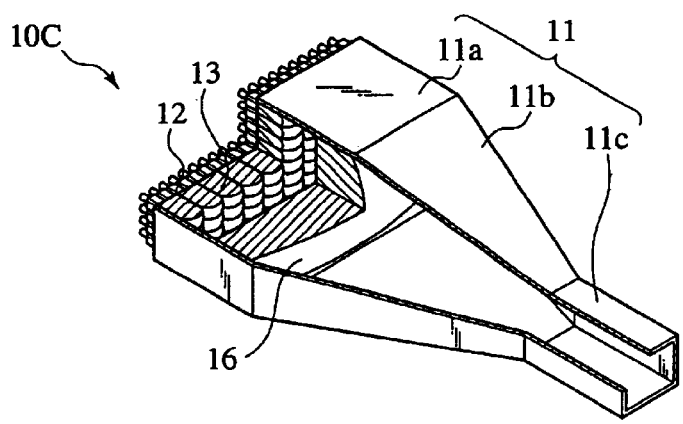
FIG. 12 is a partial cross sectional view showing a light source device of Embodiment 3 according to the present invention, a part of the device being shown as a cross section.

FIG. 10 is a constitution diagram showing the light source device of Embodiment 3 and the projection type display unit of Embodiment 3 to which the light source device is applied according to the present invention. FIG. 11 is an exploded perspective view showing the light source device of Embodiment 3 according to the present invention in an exploded manner. FIG. 12 is a partial cross sectional view showing a light source device of Embodiment 3 according to the present invention, a part of the device being shown as a cross section. FIGS. 13A to 13D are perspective views showing the aspect ratios of an LED lens array, toroidal lens, light guide, and DMD in the light source device and projection type display unit of Embodiment 3 according to the present invention.

A light source device 10C of Embodiment 3 according to the present invention and a projection type display unit 1C of Embodiment 3 to which the light source device 10C is applied as shown in FIG. 10 have constitutions similar to those of the light source devices 10A, 10B and projection type display units 1A, 1B of Embodiments 1, 2 described above except a part. For the sake of convenience in the description, the same constituting members as those of Embodiments 1, 2 are denoted with the same reference numerals, the constituting members different from those of Embodiments 1, 2 are denoted with new reference numerals, and only the respect different from that of Embodiment 1 or 2 will be described.

That is, as shown in FIG. 10, the projection type display unit 1C of Embodiment 3 substantially comprises the light source device 10C, image display part optical system 20, and projection part optical system 30, and only the light source device 10C is different from Embodiments 1 and 2.

In the light source device 10C, as shown in FIGS. 10 to 12, the LED array 13 is attached to the rectangular substrate 12 in the large quadratic prism portion 11a on the light incidence port side of the light guide 11 in the same manner as in Embodiments 1, 2. The present embodiment is different from Embodiments 1, 2 in that a toroidal lens 16 is attached as the condensing lens for condensing each color light emitted from the LED array 13. Therefore, the LED array 13 and toroidal lens 16 are arranged in that order toward the light emission port side on the light incidence port side inside the light guide 11.

The toroidal lens 16 is a biaxial lens including a donut-shaped lens surface. Since a curvature radius Rx of a horizontal direction (transverse direction) and a curvature radius Ry of the vertical direction can be set to different values as shown in FIG. 11, the aspect ratio of the LED array 13 can be set to a value described later.

That is, in general, to raise the luminance of the light source device, the number of red LEDs 13R, green LEDs 13G, blue LEDs 13B to be integrated, constituting the LED array 13, is increased. However, when the number of integrated LEDs is increased still with the conventional aspect ratio, the thickness of the light source device is increased, and, as a result, the light source device is enlarged.

To solve the problem, when the number of integrated red LEDs 13R, green LEDs 13G, blue LEDs 13B constituting the LED array 13 is increased, a horizontal direction component of the aspect ratio by the horizontal and vertical directions of the LED array 13 is set to be larger than that of the aspect ratio of the mirror surface 29m (FIG. 13D) of the DMD 29, the device is thinned without increasing the thickness of the light source device 10C. In this case, the curvature radius Rx of the transverse direction and the curvature radius Ry of the vertical direction of the toroidal lens 16 are changed in accordance with the aspect ratio of the LED array 13. In this case, needless to say, a condensing angle θ1″ of the toroidal lens 16 also changes. Therefore, an inclination angle θ2″ of the quadrangular pyramid portion 11b of the light guide 11 is set to be substantially equal to the condensing angle θ1″ of the toroidal lens 16, and therefore each color light from the LED array 13 can be converged with good efficiency.

Figure 13A:
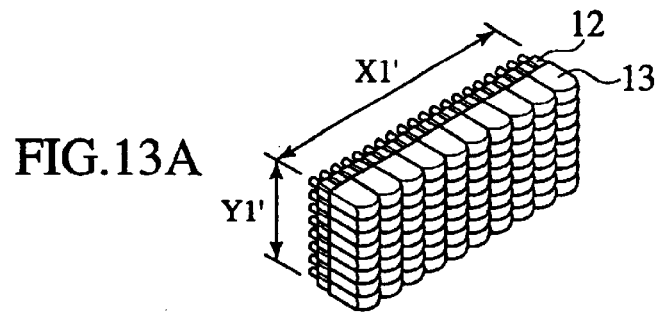
FIGS. 13A to 13D are perspective views showing aspect ratios of an LED lens array, toroidal lens, light guide, and DMD in the light source device and projection type display unit of Embodiment 3 according to the present invention.

More concretely, as shown in FIG. 13A, an aspect ratio X1':Y1' by a horizontal direction dimension X1' and vertical direction dimension Y1' of the LED array 13 is set, for example, to 5:2.

Figure 13B:
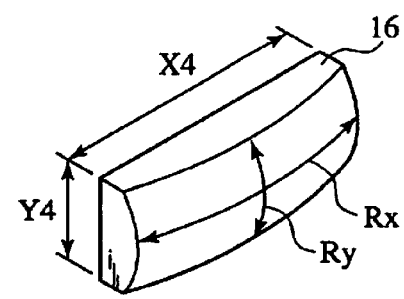
Figure 13C:
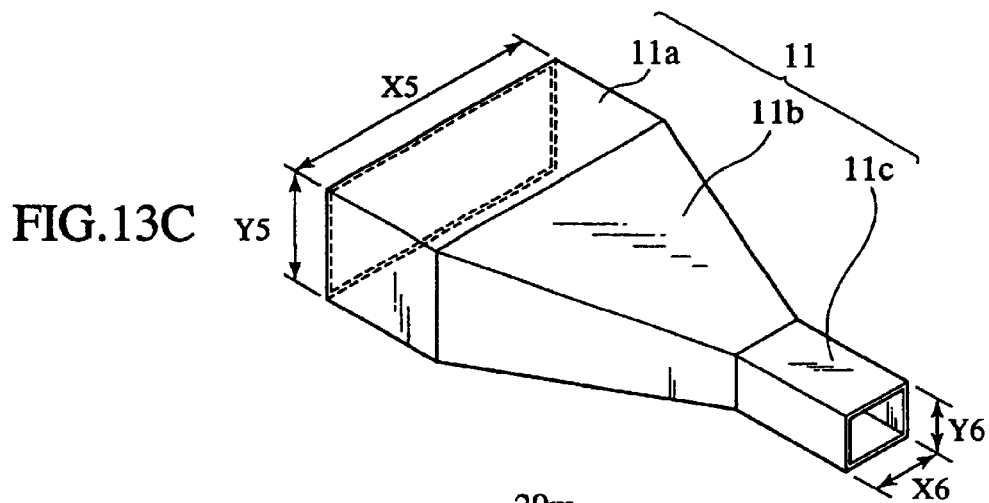
Figure 13D:
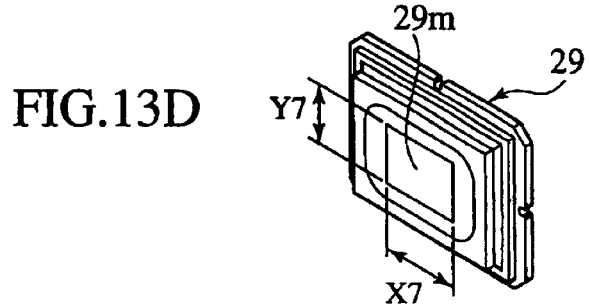

Moreover, as shown in FIG. 13D, the aspect ratio X7:Y7 of the mirror surface 29m of the DMD 29 is set, for example, to 4:3.

Furthermore, as shown in FIG. 13B, an aspect ratio X4:Y4 of the toroidal lens 16 is set to 5:2, and a curvature radius ratio Rx:Ry of the transverse direction to the vertical direction of the toroidal lens 16 is set to 0.533:1. Then, the aspect ratio after passage of each color light from the LED array 13, whose aspect ratio X1':Y1' is set to 5:2, through the toroidal lens 16 is converted to 4:3.

Therefore, as shown in FIG. 13C, an aspect ratio X5:Y5 on the light incidence port side of the large quadratic prism portion 11a of the light guide 11 in which the LED array 13 and toroidal lens 16 are stored is 5:2. On the other hand, an aspect ratio X6:Y6 of the small quadratic prism portion 11c which is the light emission port is 4:3 by conversion by the toroidal lens 16. Moreover, each color light emitted from the light emission port of the small quadratic prism portion 11c of the light guide 11 is guided into the mirror surface 29m of the DMD 29 while an aspect ratio of 4:3 is maintained, and the surface is irradiated when the aspect ratio agrees with the aspect ratio X7:Y7=4:3 of the mirror surface 29m of the DMD 29. Accordingly, it is possible to irradiate the surface with each uniform color light without any color unevenness with good efficiency.

Accordingly, the projection type display unit 1C to which the light source device 10C is applied can project the color image onto the screen (not shown) without any color unevenness at a high image quality. Needless to say, the light source device 10C and the projection type display unit 1C to which the light source device 10C is applied also obtain an effect similar to that of Embodiment 1.

<Embodiment 4>

FIG. 14 is a constitution diagram showing the light source device of Embodiment 4 and the projection type display unit of Embodiment 4 to which the light source device is applied according to the present invention.

A light source device 10D of Embodiment 4 according to the present invention and a projection type display unit 1D of Embodiment 4 to which the light source device 10D is applied as shown in FIG. 14 have constitutions similar to those of the light source devices 10A to 10C and projection type display units 1A to 1C of Embodiments 1 to 3 described above except a part. For the sake of convenience in the description, the same constituting members as those of Embodiments 1 to 3 are denoted with the same reference numerals, only the light source device 10D is denoted with the new reference numeral, and only the different respect from Embodiments 1 to 3 will be described.

That is, as shown in FIG. 14, the projection type display unit 1D of Embodiment 4 substantially comprises the light source device 10D, image display part optical system 20, and projection part optical system 30, and only the light source device 10D is different from Embodiments 1 to 3.

In the above-described light source device 10D, a part of a shape of the light guide is changed with respect to Embodiments 1 to 3. A light guide 41 is largely opened in a large quadrangular shape on the light incidence port side to form a quadrangular pyramid portion 41a whose inner wall surface is reduced toward the light emission port side. A small quadratic prism portion 41b opened in a small quadrangular shape on the light emission port side is integrally formed following the quadrangular pyramid portion 41a. Moreover, mirror surfaces 41am, 41bm are mirror-surface-processed along the inner wall surfaces of the large quadrangular pyramid portion 41a and small quadratic prism portion 41b by the use of aluminum, silver or the like. In this case, the portion via which the mirror surfaces 41am, 41bm formed along the inner wall surface of the light guide 41 are bonded to each other is continued without any gap, and is subjected to the mirror-surface processing. Accordingly, the light emitted from an LED array 43 described later is prevented from leaking. Moreover, the light from the LED array 43 repeats the total reflection on the respective mirror surfaces 41am, 41bm, and can be emitted via the light emission port side of the small quadratic prism portion 41b of the light guide 41 with good efficiency.

It is to be noted that the plate-shaped mirrors (not shown) including the mirror surfaces formed along the inner wall surface of the light guide 41 may also be bonded.

Moreover, in the quadrangular pyramid portion 41a on the light incidence port side of the light guide 41, the LED array (semiconductor light emitting device array) 43 is attached in which a plurality of red LED 43R, green LED 43G, blue LED 43B emitting red (R) light, green (G) light, and blue (B) light are arranged on one spherical substrate (or one non-spherical substrate) 42 having a rectangular outer shape and a spherically (or non-spherically) formed inner surface in accordance with the ratio of emission luminance. Furthermore, the respective color lights emitted from these red LED 43R, green LED 43G, blue LED 43B are converged toward a central axis of the spherical surface (or the non-spherical surface). Therefore, the inclination angle (not shown) of the quadrangular pyramid portion 41a of the light guide 41 is set substantially along the condensing angle (not shown) of the light from the LED array 43 disposed in the spherical shape (or the non-spherical shape).

Moreover, the LED array 43 is connected to a time-division driving circuit 44 via the spherical substrate (or the non-spherical substrate) 42, one field of the image displayed in the DMD 29 in the image display part optical system 20 is divided into three by the time-division driving circuit 44, and the LEDs 43R, 43G, 43B are time-divisionally driven for the respective colors.

Furthermore, each color light from the LED array 43 in the light source device 10D is guided into the small quadratic prism portion 41b from the quadrangular pyramid portion 41a, repeats the total reflection by the mirror surface 41bm formed on the inner wall surface of the small quadratic prism portion 41b, proceeds toward the light emission port, and is thereafter incident upon the image display part optical system 20. Thereafter, in the same manner as in Embodiments 1 to 3, the image light modulated for each of R, G, B by the image display part optical system 20 is projected onto the screen (not shown) by the projection part optical system 30, and the image light projected onto the screen is integrated in the human visual sense by the high-rate repetition by the time-divisional driving, and recognized as the full-color image.

Therefore, as described above, the light emitted from the LED array 43 can be converged even in the light source device 10D with good efficiency. The color image can be projected onto the screen (not shown) without any color unevenness and with the high image quality even in the projection type display unit 1D to which the light source device 10D is applied.

<Embodiment 5>

Figure 15:
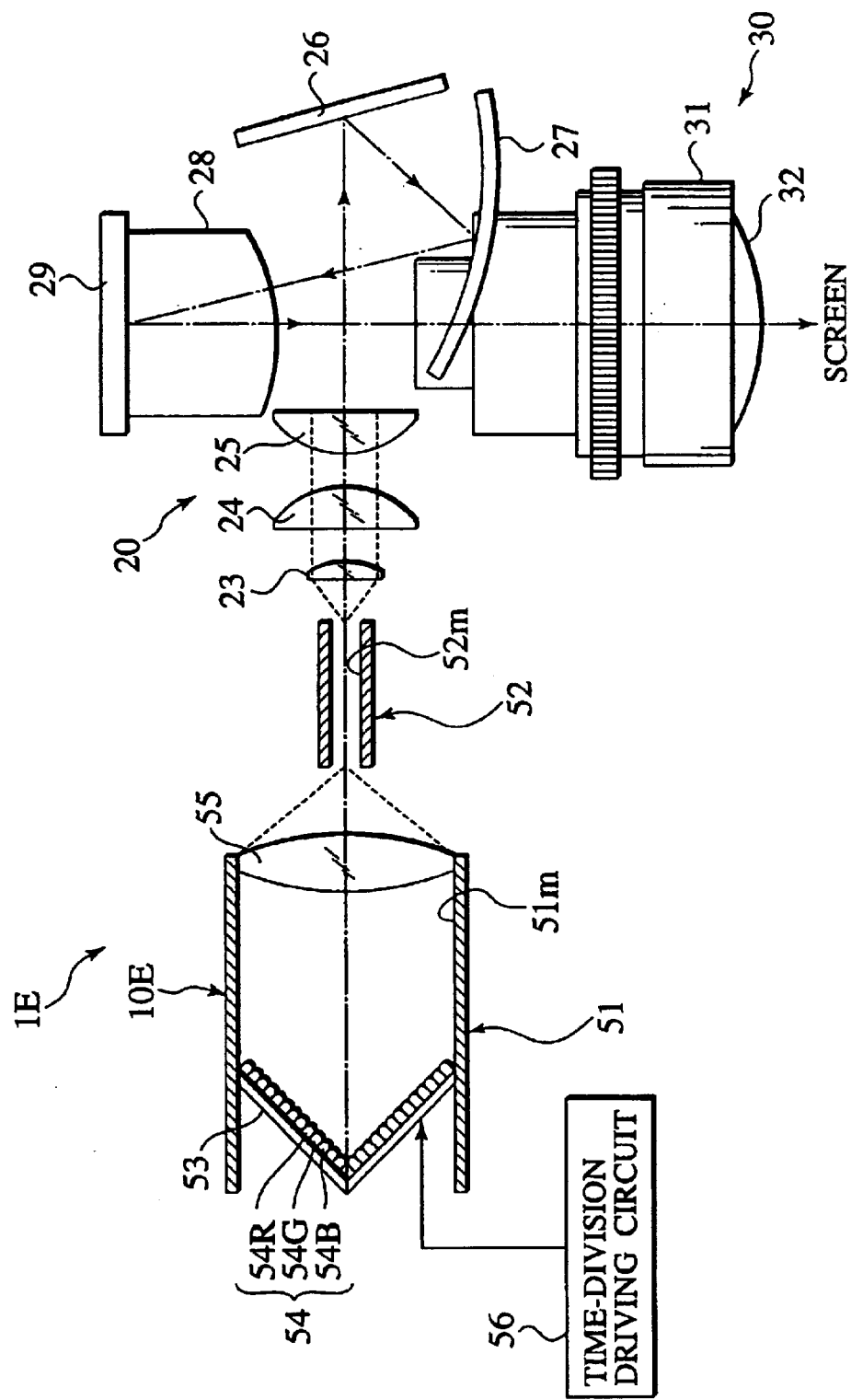
FIG. 15 is a constitution diagram showing the light source device of Embodiment 5 and the projection type display unit of Embodiment 5 to which the light source device is applied according to the present invention.

FIG. 15 is a constitution diagram showing the light source device of Embodiment 5 and the projection type display unit of Embodiment 5 to which the light source device is applied according to the present invention.

A light source device 10E of Embodiment 5 according to the present invention and a projection type display unit 1E of Embodiment 5 to which the light source device 10E is applied as shown in FIG. 15 have constitutions similar to those of the light source devices 10A to 10D and projection type display units 1A to 1D of Embodiments 1 to 4 described above except a part. For the sake of convenience in the description, the same constituting members as those of Embodiments 1 to 4 are denoted with the same reference numerals, only the light source device 10E is denoted with the new reference numeral, and only the different respect from Embodiments 1 to 4 will be described.

That is, as shown in FIG. 15, the projection type display unit 1E of Embodiment 5 substantially comprises the light source device 10E, image display part optical system 20, and projection part optical system 30, and only the light source device 10E is different from Embodiments 1 to 4.

In the above-described light source device 10E, the shape of the light guide is changed with respect to Embodiments 1 to 4. A first light guide 51 formed in a large-diameter cylindrical shape is disposed on the light incidence port side, a second light guide 52 formed in a small-diameter cylindrical shape is disposed on the light emission port side, and the first light guide 51 is disposed separately from the second light guide 52 at a predetermined distance. In this case, a distance between the first light guide 51 and the second light guide 52 is set to be substantially equal to a light condensing distance of a convex lens 55 described later, and a space is formed in a distance section between the first light guide 51 and the second light guide 52.

Moreover, mirror surfaces 51$m$, 52$m$ are mirror-surface-processed along the inner wall surfaces of the first and second light guides 51, 52 by the use of aluminum, silver or the like.

It is to be noted that in the light source device 10E, a case where the first light guide 51 is separated from the second light guide 52 has been described, but the present invention is not limited to this, and the first light guide 51 may also be integrated with the second light guide 52 substantially in a shape similar to that of Embodiment 1.

Moreover, on the light incidence port side in the first light guide 51, an LED array (semiconductor light emitting device array) 54 is attached in which a plurality of red LED 54R, green LED 54G, blue LED 54B emitting red (R) light, green (G) light, and blue (B) light are arranged on one V-shaped substrate 53 having a rectangular outer shape and a V-shaped inner surface in accordance with the ratio of emission luminance. The respective color lights emitted from these red LED 54R, green LED 54G, blue LED 54B are converged by the convex lens 55 which is the condensing lens disposed on the light emission port in the first light guide 51, and guided into the second light guide 52. Thereafter, the lights repeat the total reflection on the mirror surface 52$m$ formed on the inner wall surface of the second light guide 52, and can be emitted on the light emission port side of the second light guide 52 with good efficiency.

Moreover, the LED array 54 is connected to a time-division driving circuit 56 via the V-shaped substrate 53, one field of the image displayed in the DMD 29 in the image display part optical system 20 is divided into three by the time-division driving circuit 56, and the LEDs 54R, 54G, 54B are time-divisionally driven for the respective colors.

Furthermore, as described above, each color light from the LED array 54 in the light source device 10E is converged by the convex lens 55 disposed in the light emission port in the first light guide 51, guided into the second light guide 52, repeats the total reflection by the mirror surface 52$m$ formed on the inner wall surface of the second light guide 52, proceeds toward the light emission port, and is thereafter incident upon the image display part optical system 20. Thereafter, in the same manner as in Embodiments 1 to 4, the image light modulated for each of R, G, B by the image display part optical system 20 is projected onto the screen (not shown) by the projection part optical system 30, and the image light projected onto the screen is integrated in the human visual sense by the high-rate repetition by the time-divisional driving, and recognized as the full-color image.

Therefore, as described above, the light emitted from the LED array 53 can be converged even in the light source device 10E with good efficiency. The color image can be projected onto the screen (not shown) without any color unevenness and with the high image quality even in the projection type display unit 1E to which the light source device 10E is applied.

<Embodiment 6>

Figure 16:
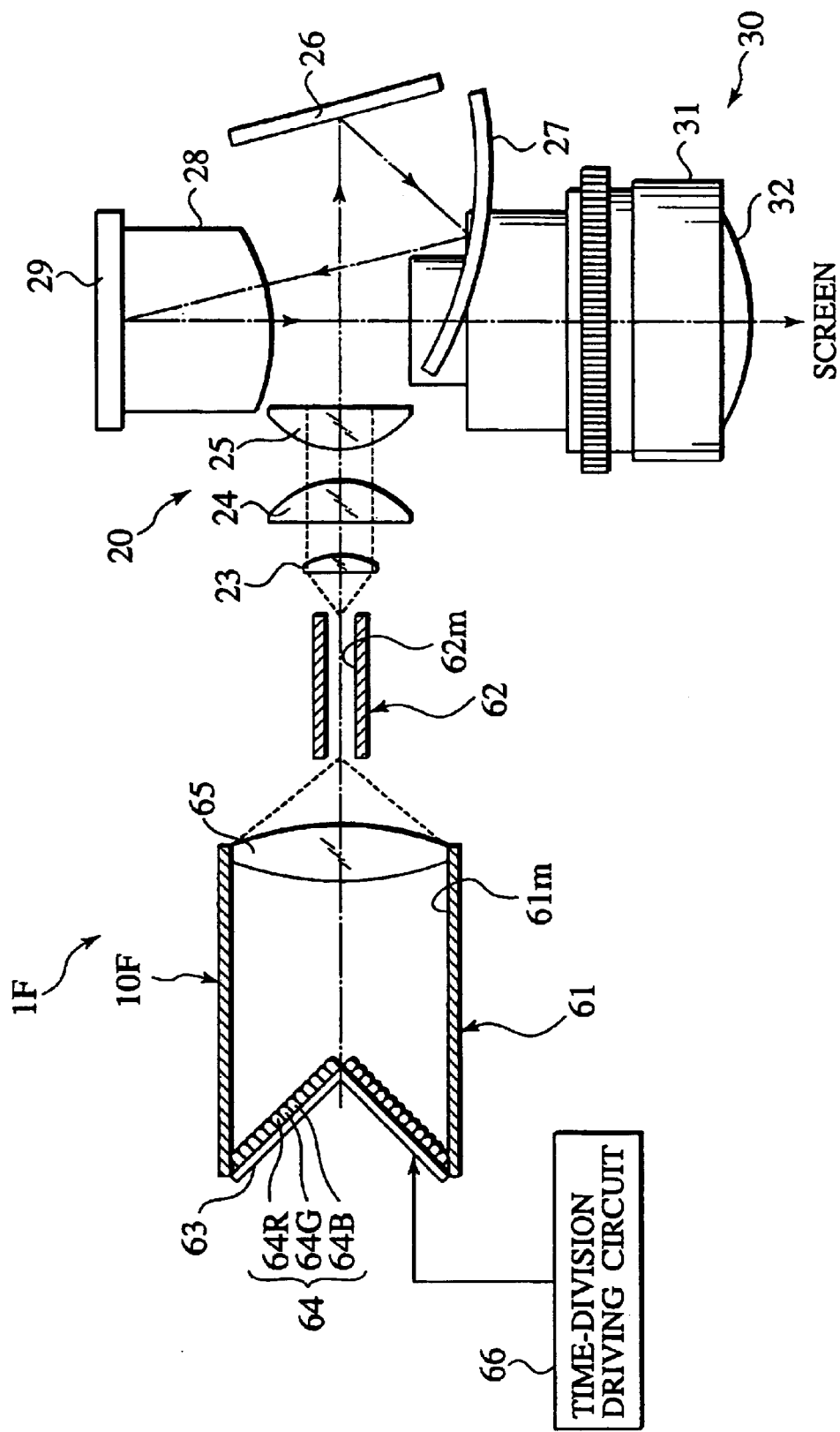
FIG. 16 is a constitution diagram showing the light source device of Embodiment 6 and the projection type display unit of Embodiment 6 to which the light source device is applied according to the present invention.

FIG. 16 is a constitution diagram showing the light source device of Embodiment 6 and the projection type display unit of Embodiment 6 to which the light source device is applied according to the present invention.

A light source device 10F of Embodiment 6 according to the present invention and a projection type display unit 1F of Embodiment 6 to which the light source device 10F is applied as shown in FIG. 16 are different from the light source device 10E and projection type display unit 1E of Embodiment 5 described above in that the LED array is disposed in an inverted V-shape, only the light source device 10F is denoted with the new reference numerals, and only the different respect from Embodiment 5 will be described.

That is, as shown in FIG. 16, the projection type display unit 1F of Embodiment 6 substantially comprises the light source device 10F, image display part optical system 20, and projection part optical system 30.

In the above-described light source device 10F, the shape of the light guide is constituted in the same manner as in Embodiment 5, a first light guide 61 formed in the large-diameter cylindrical shape is disposed on the light incidence port side, a second light guide 62 formed in the small-diameter cylindrical shape is disposed on the light emission port side, and the first light guide 61 is disposed apart from the second light guide 62 at the predetermined distance. In this case, the distance between the first light guide 61 and the second light guide 62 is set to be substantially equal to the light condensing distance of a convex lens 65 described later, and the space is formed in the distance section between the first light guide 61 and the second light guide 62.

Moreover, mirror surfaces 61$m$, 62$m$ are mirror-surface-processed along the inner wall surfaces of the first and second light guides 61, 62 by the use of aluminum, silver or the like.

It is to be noted that in the light source device 10F, a case where the first light guide 61 is separated from the second light guide 62 has been described, but the present invention is not limited to this, and the first light guide 61 may also be integrated with the second light guide 62 substantially in a shape similar to that of Embodiment 1.

Moreover, on the light incidence port side in the first light guide 61, an LED array (semiconductor light emitting device array) 64 is attached in which a plurality of red LED 64R, green LED 64G, blue LED 64B emitting red (R) light, green (G) light, and blue (B) light are arranged on one inverted V-shaped substrate 63 having the rectangular outer shape and an inverted V-shaped inner surface in accordance with the ratio of emission luminance. The respective color lights emitted from these red LED 64R, green LED 64G, blue LED 64B are converged by the convex lens 65 which is the condensing lens disposed on the light emission port in the first light guide 61, and guided into the second light guide 62. Thereafter, the lights repeat the total reflection on the mirror surface 62m formed on the inner wall surface of the second light guide 62, and can be emitted on the light emission port side of the second light guide 62 with good efficiency.

Moreover, the LED array 64 is connected to a time-division driving circuit 66 via the inverted V-shaped substrate 63, one field of the image displayed in the DMD 29 in the image display part optical system 20 is divided into three by the time-division driving circuit 66, and the LEDs 64R, 64G, 64B are time-divisionally driven for the respective colors.

Furthermore, each color light from the LED array 64 in the light source device 10F is converged by the convex lens 65 disposed in the light emission port in the first light guide 61 as described above, guided into the second light guide 62, repeats the total reflection by the mirror surface 62m formed on the inner wall surface of the second light guide 62, proceeds toward the light emission port, and is thereafter incident upon the image display part optical system 20. Thereafter, in the same manner as in Embodiment 5, the image light modulated for each of R, G, B by the image display part optical system 20 is projected onto the screen (not shown) by the projection part optical system 30, and the image light projected onto the screen is integrated in the human visual sense by the high-rate repetition by the time-divisional driving, and recognized as the full-color image.

Therefore, as described above, the light emitted from the LED array 63 can be converged even in the light source device 10F with good efficiency. The color image can be projected onto the screen (not shown) without any color unevenness and with the high image quality even in the projection type display unit 1F to which the light source device 10F is applied.

<Embodiment 7>

Figure 17:
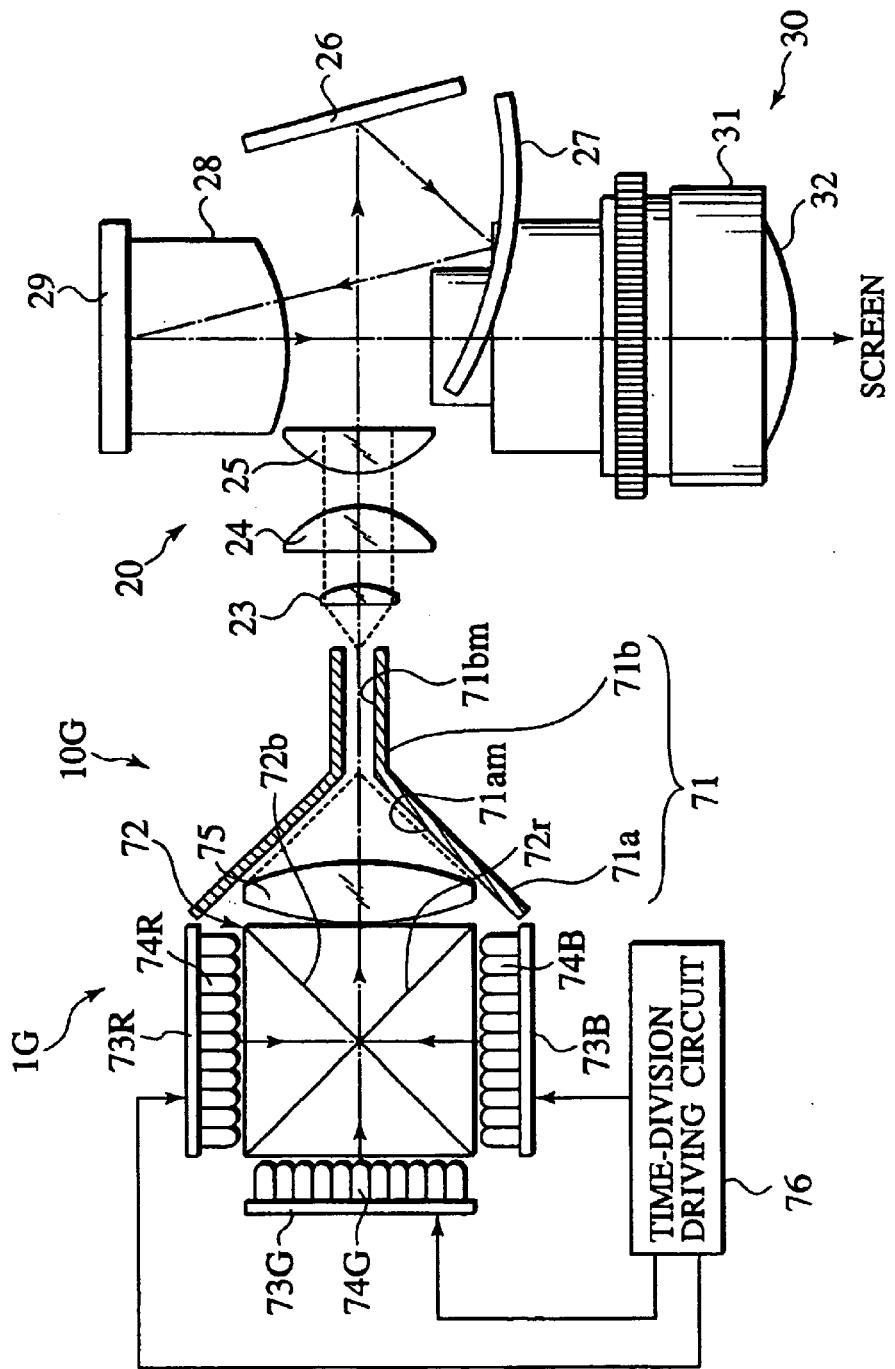
FIG. 17 is a constitution diagram showing the light source device of Embodiment 7 and the projection type display unit of Embodiment 7 to which the light source device is applied according to the present invention.

FIG. 17 is a constitution diagram showing the light source device of Embodiment 7 and the projection type display unit of Embodiment 7 to which the light source device is applied according to the present invention.

Figure 1:
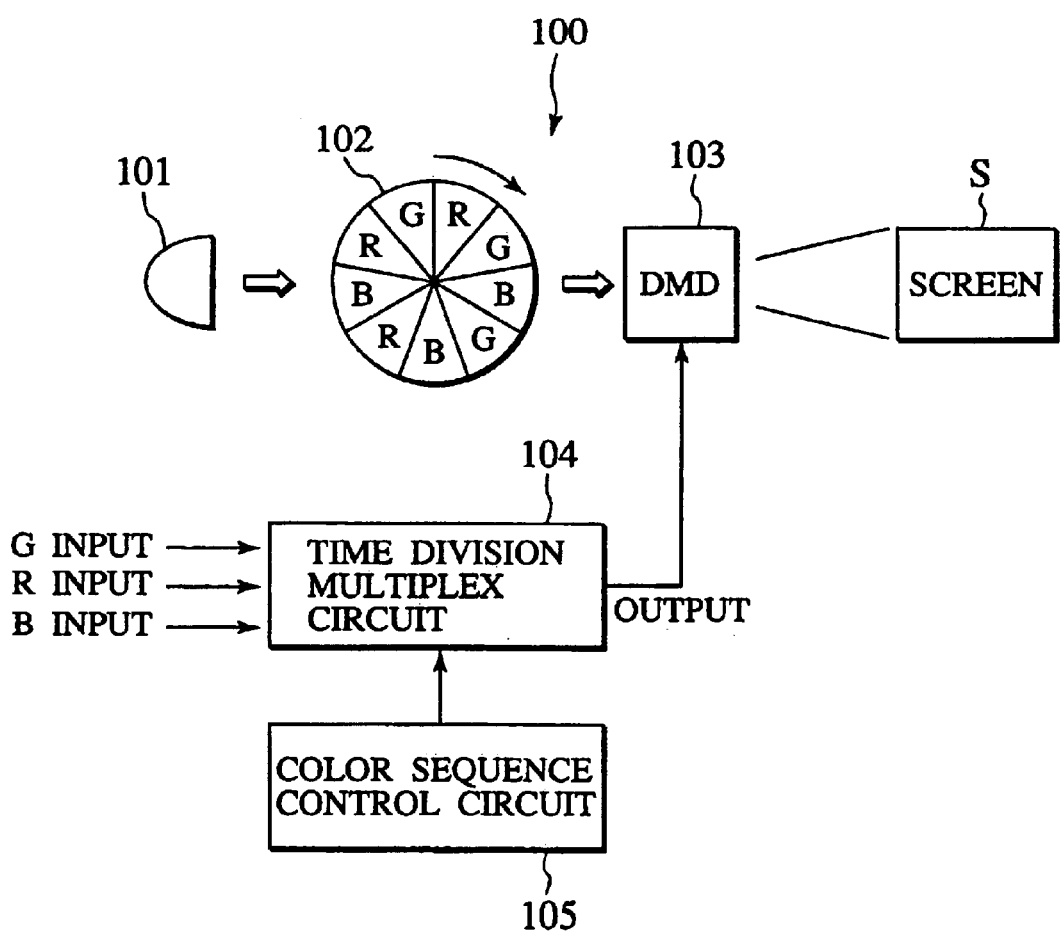
FIG. 1 is a block diagram showing an image display unit of Prior Art 1.
Figure 2A:
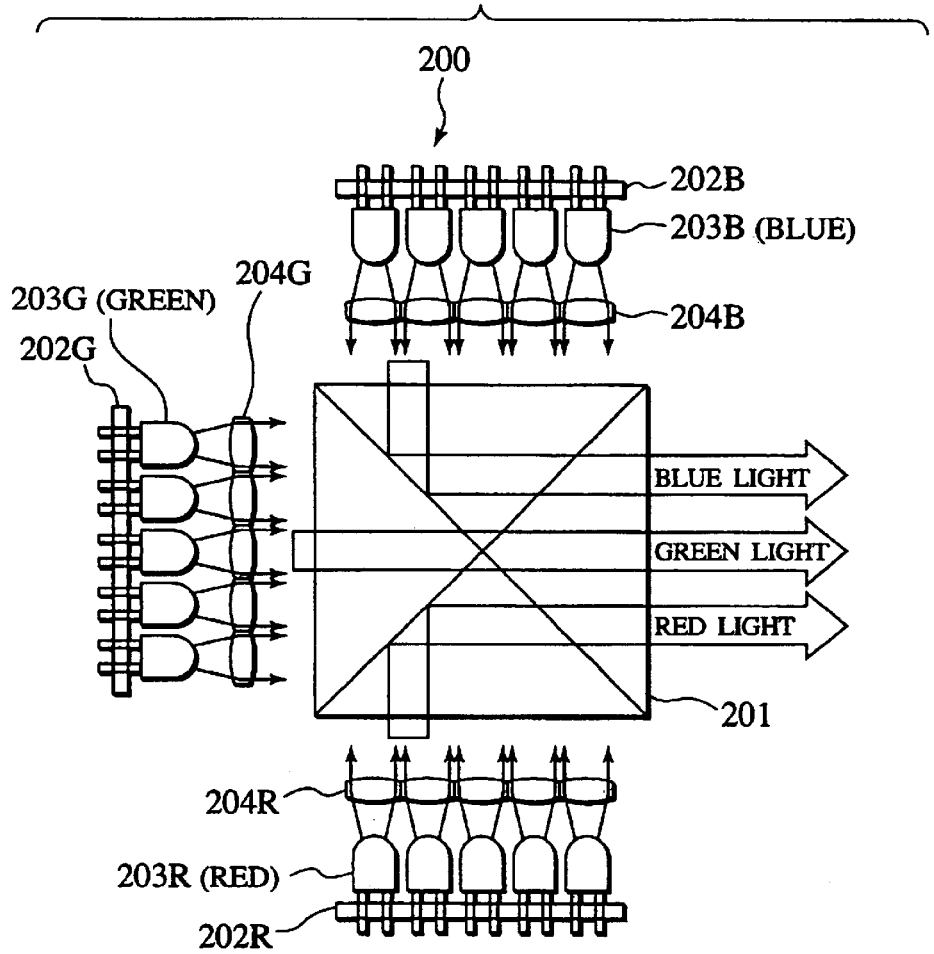
FIGS. 2A and 2B are explanatory views of a light source device in which LED arrays for three colors RGB are used according to a Prior Art 2.
Figure 2B:
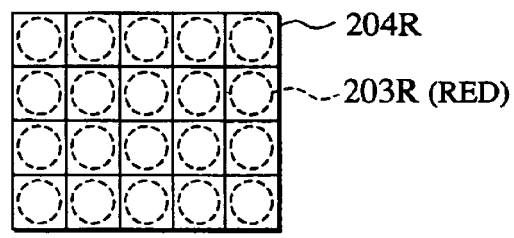

A light source device 10G of Embodiment 7 according to the present invention and a projection type display unit 1G of Embodiment 7 to which the light source device 10G is applied as shown in FIG. 17 enhance uniformity of illuminating with respect to the light source device 200 (FIG. 2) of Prior Art 2 described above, and have constitutions similar to those of the light source devices 10A to 10F and projection type display units 1A to 1F of Embodiments 1 to 6 described above except a part. For the sake of convenience in the description, the same constituting members as those of Embodiments 1 to 6 are denoted with the same reference numerals, only the light source device 10G is denoted with the new reference numerals, and only the different respect from Embodiments 1 to 6 will be described.

That is, as shown in FIG. 17, the projection type display unit 1G of Embodiment 7 substantially comprises the light source device 10G, image display part optical system 20, and projection part optical system 30, and only the light source device 10G is different from Embodiments 1 to 6.

In the above-described light source device 10G, the light guide is formed in substantially the same shape as that of Embodiment 4, a light guide 71 is largely opened in the large quadrangular shape on the light incidence port side to form a quadrangular pyramid portion 71a whose inner wall surface is reduced toward the light emission port side, and a small quadratic prism portion 71b opened in the small quadrangular shape on the light emission port side is integrally formed following the quadrangular pyramid portion 71a. Moreover, mirror surfaces 71am, 71bm are mirror-surface-processed along the inner wall surfaces of the large quadrangular pyramid portion 71a and small quadratic prism portion 71b by the use of aluminum, silver or the like. In this case, the portion via which the mirror surfaces 71am, 71bm formed along the inner wall surface of the light guide 71 are bonded to each other is continued without any gap, and is subjected to the mirror-surface processing. Accordingly, the lights emitted from LED arrays for three colors 74R, 74G, 74B described later are prevented from leaking. Moreover, the lights from the LED arrays for three colors 74R, 74G, 74B repeat the total reflection on the respective mirror surfaces 71am, 71bm, and can be emitted via the light emission port side of the small quadratic prism portion 71b in the light guide 71 with good efficiency.

It is to be noted that the plate-shaped mirrors (not shown) including the mirror surfaces formed along the inner wall surface of the light guide 71 may also be bonded.

Moreover, a cubic dichroic prism 72 is disposed in the vicinity of the light incidence port side of the quadrangular pyramid portion 71a of the light guide 71. Moreover, facing three side surfaces of the dichroic prism 72 crossing one another at right angles, there are disposed: the red LED array 74R including a plurality of red LEDs two-dimensionally arranged on a substrate 73R for R; the green LED array 74G including a plurality of green LEDs two-dimensionally arranged on a substrate 73G for G; and the blue LED array 74B including a plurality of blue LEDs two-dimensionally arranged on a substrate 73B for B. Therefore, three side surfaces of the dichroic prism 72 crossing one another at right angles face the red LED array 74R, the green LED array 74G, and the blue LED array 74B, respectively. A plurality of red LEDs all emitting the light of the same color of red are two-dimensionally arranged on a substrate in the red LED array 74R. A plurality of green LEDs all emitting the light of the same color of green are two-dimensionally arranged on a substrate in the green LED array 74G. A plurality of blue LEDs all emitting the light of the same color of blue are two-dimensionally arranged on a substrate in the blue LED array 74B.

Furthermore, the side surface of the dichroic prism 72 on which the respective color LED arrays 74R, 74G, 74B are not disposed constitutes a light emission surface which emits the red, green, and blue lights.

In this case, in the dichroic prism 72, a first dichroic mirror 72r which reflects the red light emitted from the red LED array 74R and which passes the green light emitted from the green LED array 74G intersects with a second dichroic mirror 72b which reflects the blue light emitted from the blue LED array 74B and which passes the green light emitted from the green LED array 74G in a cross shape in a middle part with inclination of ±45°.

Moreover, a convex lens 75 constituting the condensing lens is disposed in the quadrangular pyramid portion 71a of the light guide 71 on the light emission surface side of the dichroic prism 72.

Furthermore, the red LED array 74R, green LED array 74G, blue LED array 74B are connected to a time-division driving circuit 76 via the substrate 73R for R, substrate 73G for G, substrate 73B for B, one field of the image displayed in the DMD 29 of the image display part optical system 20 is divided into three by the time-division driving circuit 76, and the LED arrays 74R, 74G, 74B are time-divisionally driven for the respective colors.

Moreover, the red light emitted from the red LED array 74R turns toward the light emission surface, when the first dichroic mirror 72r in the dichroic prism 72 selectively reflects a wavelength band of the red light. Similarly, the blue light emitted from the blue LED array 74B turns toward the light emission surface, when the second dichroic mirror 72b in the dichroic prism 72 selectively reflects the wavelength band of the blue light. Furthermore, the green light emitted from the green LED array 74G passes through the first and second dichroic mirrors 72r, 72b in the dichroic prism 72 and turns toward the light emission surface. Accordingly, the respective color lights from the red LED array 74R, green LED array 74G, blue LED array 74B disposed on three of the side surfaces of the dichroic prism 72 crossing one another at right angles are emitted from the same light emission surface in the dichroic prism 72.

Thereafter, for the red, green, blue lights emitted from the dichroic prism 72, the beam area is reduced in accordance with the condensing angle (not shown) of the convex lens 75 every time-divisional driving. However, in this case, the inclination angle (not shown) of the quadrangular pyramid portion 71a of the light guide 71 is set to be substantially equal to the condensing angle of the convex lens 75. Accordingly, the respective color lights from the LED arrays 74R, 74G, 74B for three colors can be converged with good efficiency. In other words, the inner wall surface of the quadrangular pyramid portion 71a of the light guide 71 is narrowed down substantially along the condensing angle of the convex lens 75.

Moreover, the respective color lights converged and narrowed down by the convex lens 75 are guided along the quadrangular pyramid portion 71a of the light guide 71, thereafter repeat the total reflection on the mirror surface 71bm formed on the inner wall surface of the small quadratic prism portion 71b to form emission lights having a uniform illuminance, and are incident upon the image display part optical system 20. Thereafter, in the same manner as in Embodiments 1 to 6, the image light modulated for each of R, G, B by the image display part optical system 20 is projected onto the screen (not shown), and the image light projected on the screen is integrated in the human visual sense by the high-rate repetition by the time-divisional driving, and recognized as the full-color image.

Therefore, as described above, the respective color lights emitted from the three-color LED arrays 74R, 74G, 74B can be converged with good efficiency in the light source device 10G. The color image can be projected onto the screen (not shown) without any color unevenness and with high image quality in the projection type display unit 1G to which the light source device 10G is applied. Additionally, this embodiment has a merit that any lens array is not needed even though a dichroic prism is used as in the related art.

It is to be noted that the light source devices 10A to 10G of Embodiments 1 to 7 have been described as the projection type display units 1A to 1G of Embodiments 1 to 7 to which the DMD 29 is applied, but the present invention may also be applied to a transmission or reflection type liquid crystal panel which is another light bulb system.

Moreover, the light source devices 10A to 10G of Embodiments 1 to 7 may also be applied to the illuminating of display for exhibition, an illuminating device for photography of the color image or the like. Furthermore, it is also possible to apply the present invention to a backlight of a liquid crystal monitor. In this case, since the back light emits each color light, a color filter is unnecessary, and a multi-color can be represented by one pixel. Therefore, there can be provided a monitor which is high in resolution and color reproducibility.

More generally, it should be understood that many modifications and adaptations of the invention will become apparent to those skilled in the art and it is intended to encompass such obvious modifications and changes in the scope of the claims appended hereto.

What is claimed is:

1. A light source device comprising:
   a semiconductor light emitting device array having a plurality of semiconductor light emitting devices arranged two-dimensionally on a substrate;
   a condensing lens which converges light emitted from the semiconductor light emitting device array; and
   a light guide in which a mirror surface is formed along an inner wall surface from a light incidence port to a light emission port and in which the semiconductor light emitting device array and the condensing lens are arranged in that order toward the light emission port inside the light incident port and whose part of the inner wall surface is narrowed down substantially along a condensing angle of the condensing lens to emit the light converged by the condensing lens via the light emission port.

2. The light source device according to claim 1, wherein the light guide comprises parallel inner wall surfaces facing each other and following a portion obtained by narrowing down a part of the inner wall surface in order to emit the light (or color light) converged by the condensing lens while repeatedly reflecting the light by the mirror surface.

3. A projection type display unit comprising:
   the light source device according to claim 1;
   an image display part optical system which irradiates an image display device with the light (or color light) emitted from the light source device; and
   a projection part optical system which projects an image light displayed on the image display device.

4. A light source device comprising:
   a dichroic prism having first and second dichroic mirrors which are formed intersecting with each other therein;
   semiconductor light emitting device arrays for three colors, which are respectively arranged to face three side surfaces of the dichroic prism crossing one another at right angles, each array including a substrate and a plurality of semiconductor light emitting devices that are two-dimensionally arranged on the substrate and emit the light of each color of the three colors;
   a condensing lens that condenses respective color lights which are emitted from the semiconductor light emitting device arrays for three colors and whose wavelength bands are selected by the first and second dichroic mirrors via the dichroic prism; and
   a light guide in which a mirror surface is formed from a light incidence port to a light emission port along an inner wall surface and in which the dichroic prism is disposed in the vicinity of the light incidence port and in which the condensing lens is disposed inside the light incidence port and which emits the respective color lights obtained by narrowing down a part of the inner wall surface substantially along a condensing angle of the condensing lens and condensing the respective color lights by the condensing lens via the light emission port.

5. The light source device according to claim 4, wherein the light guide comprises parallel inner wall surfaces facing each other and following a portion obtained by narrowing down a part of the inner wall surface in order to emit the light (or the respective color lights) converged by the condensing lens while repeatedly reflecting the light by the mirror surface.

6. A projection type display unit comprising:

the light source device according to claim 4;

an image display part optical system which irradiates an image display device with the light (or the respective color lights) emitted from the light source device; and a projection part optical system which projects an image light displayed on the image display device.

7. A projection type display unit comprising:

a semiconductor light emitting device array having a plurality of semiconductor light emitting devices arranged two-dimensionally on a substrate;

a toroidal lens which converges light emitted from the semiconductor light emitting device array;

a light guide in which a mirror surface is formed from a light incidence port to a light emission port along an inner wall surface and in which the semiconductor light emitting device array and the toroidal lens are arranged in that order toward the light emission port inside the light incidence port and in which the light obtained by narrowing down a part of the inner wall surface substantially along a condensing angle of the toroidal lens and converging the light by the toroidal lens is emitted from the light emission port;

an image display part optical system which irradiates an image display device with the light emitted from the light emission port side of the light guide; and a projection part optical system which projects an image light displayed on the image display device, wherein a horizontal direction component of an aspect ratio of the semiconductor light emitting device array is set to be larger than that of an aspect ratio of the image display device, and the aspect ratio on the light emission port side of the light guide is converted by the toroidal lens to be substantially matched with the aspect ratio of the image display device.

* * * * *